United States Patent
Fujimoto

(10) Patent No.: US 8,514,299 B2
(45) Date of Patent: Aug. 20, 2013

(54) INFORMATION PROCESSING DEVICE, INFORMATION PROCESSING METHOD, AND PROGRAM

(75) Inventor: Eisuke Fujimoto, Kanagawa (JP)

(73) Assignee: Sony Corporation, Tokyo (JP)

(*) Notice: Subject to any disclaimer, the term of this patent is extended or adjusted under 35 U.S.C. 154(b) by 582 days.

(21) Appl. No.: 12/751,290

(22) Filed: Mar. 31, 2010

(65) Prior Publication Data

US 2010/0259641 A1    Oct. 14, 2010

(30) Foreign Application Priority Data

Apr. 8, 2009    (JP) .................................. 2009-094123

(51) Int. Cl.
 *H04N 5/76* (2006.01)
 *G06K 9/00* (2006.01)
 *H04W 24/00* (2009.01)

(52) U.S. Cl.
 USPC ........ 348/231.3; 348/143; 348/116; 382/106; 455/456.1

(58) Field of Classification Search
 USPC .................. 348/231.3, 116, 552, 231.2, 239, 348/333.09, 207.99, 231.01
 See application file for complete search history.

(56) References Cited

U.S. PATENT DOCUMENTS

| 6,914,626 | B2* | 7/2005 | Squibbs ..................... 348/231.3 |
| 2004/0064338 | A1* | 4/2004 | Shiota et al. ..................... 705/1 |
| 2006/0203012 | A1* | 9/2006 | Nakajima ..................... 345/629 |
| 2008/0292212 | A1* | 11/2008 | Ozaki ............................ 382/284 |
| 2009/0214082 | A1* | 8/2009 | Hoshi ............................ 382/106 |
| 2009/0251564 | A1* | 10/2009 | Ito ................................ 348/231.2 |
| 2010/0093365 | A1* | 4/2010 | Bloebaum .................. 455/456.1 |

FOREIGN PATENT DOCUMENTS

JP    9-288445    11/1997

\* cited by examiner

*Primary Examiner* — Roberto Velez
*Assistant Examiner* — Stephen Coleman
(74) *Attorney, Agent, or Firm* — Oblon, Spivak, McClelland, Maier & Neustadt, L.L.P.

(57) ABSTRACT

An information processing device includes an imaging unit photographing images, a photographing location acquiring unit acquiring photographing locations corresponding to the images when the images are photographed by the imaging unit, a storage controlling unit storing the images sequentially photographed by the imaging unit into predetermined storage unit, a photographing location mark generating unit generating predetermined photographing location marks for showing the corresponding photographing locations in a map, and a controlling unit switching between a latitudinally-ordered display mode and a longitudinally-ordered display mode, the latitudinally-ordered display mode allowing the images to be read out of the storage unit and displayed in latitudinal order and the corresponding photographing location marks to be displayed in the map, the longitudinally-ordered display mode allowing the images to be read out of the storage unit and displayed in longitudinal order and the corresponding photographing location marks to be displayed in the map.

13 Claims, 23 Drawing Sheets

INFORMATION PROCESSING DEVICE, INFORMATION PROCESSING METHOD, AND PROGRAM

BACKGROUND OF THE INVENTION

1. Field of the Invention

The present invention relates to an information processing device, an information processing method, and a program that are suitable for digital video cameras, for example.

2. Description of the Related Art

Along with the increase in storage capacity of the recording medium of the digital video camera, it has become possible to photograph a large number of images at various locations and store and manage them in a recording medium.

In the digital video camera, these images stored in the recording medium can be displayed as thumbnail images in a list form.

An image management device is proposed for enhancing user's searching performance by displaying photographed images as reduced, thumbnail images in an index, together with a map image, and linking the reduced images to the corresponding photographing locations in the map image (see Japanese Unexamined Patent Application Publication No. 9-288445, for example).

SUMMARY OF THE INVENTION

A problem with the image management device described above is that the user is not able to recognize at which location in the map image a particular image was taken until the user selects its reduced image in the index.

It is desirable to propose an information processing device, an information processing method, and a program that enable the correspondence relationship between the images and the photographing locations in the map to be recognized in a simple and intuitive manner.

In an embodiment of the present invention, a photographing location corresponding to a photographed image is acquired when this image is photographed by imaging means, a plurality of images sequentially photographed by the imaging means are stored into predetermined storage means, predetermined photographing location marks are generated to show the photographing locations corresponding to the images in a map, and a latitudinally-ordered display mode and a longitudinally-ordered display mode can be switched to each other. In the latitudinally-ordered display mode, a plurality of images are read out of the storage means and displayed in latitudinal order and a plurality of photographing location marks corresponding to the images are displayed in the map. In the longitudinally-ordered display mode, a plurality of images are read out of the storage means and displayed in longitudinal order and a plurality of photographing location marks corresponding to the images are displayed in the map.

Since a plurality of images are read out of the storage means and displayed in latitudinal or longitudinal order and a plurality of photographing location marks corresponding to the plurality of images are displayed in the map, the user can readily understand the correspondence relationship between the plurality of images displayed in latitudinal or longitudinal order and the plurality of photographing location marks displayed in the map.

In this embodiment of the present invention, a plurality of images can be read and displayed in latitudinal or longitudinal order and a plurality of photographing location marks corresponding to the plurality of images can be displayed in a map, so that the user can readily understand the correspondence relationship between the images displayed in latitudinal or longitudinal order and the photographing location marks displayed in the map. Accordingly, the embodiment of the present invention provides an information processing device, an information processing method, and a program that enable the correspondence relationship between the images and the photographing locations in the map to be recognized in an easy and intuitive manner.

DESCRIPTION OF THE PREFERRED EMBODIMENTS

A best mode (referred to below as an embodiment) for carrying out the present invention will now be described in the following order:
1. Embodiment
2. Other embodiments

1. Embodiment

[1-1. Circuit Configuration of a Digital Video Camera]

Figure 1:
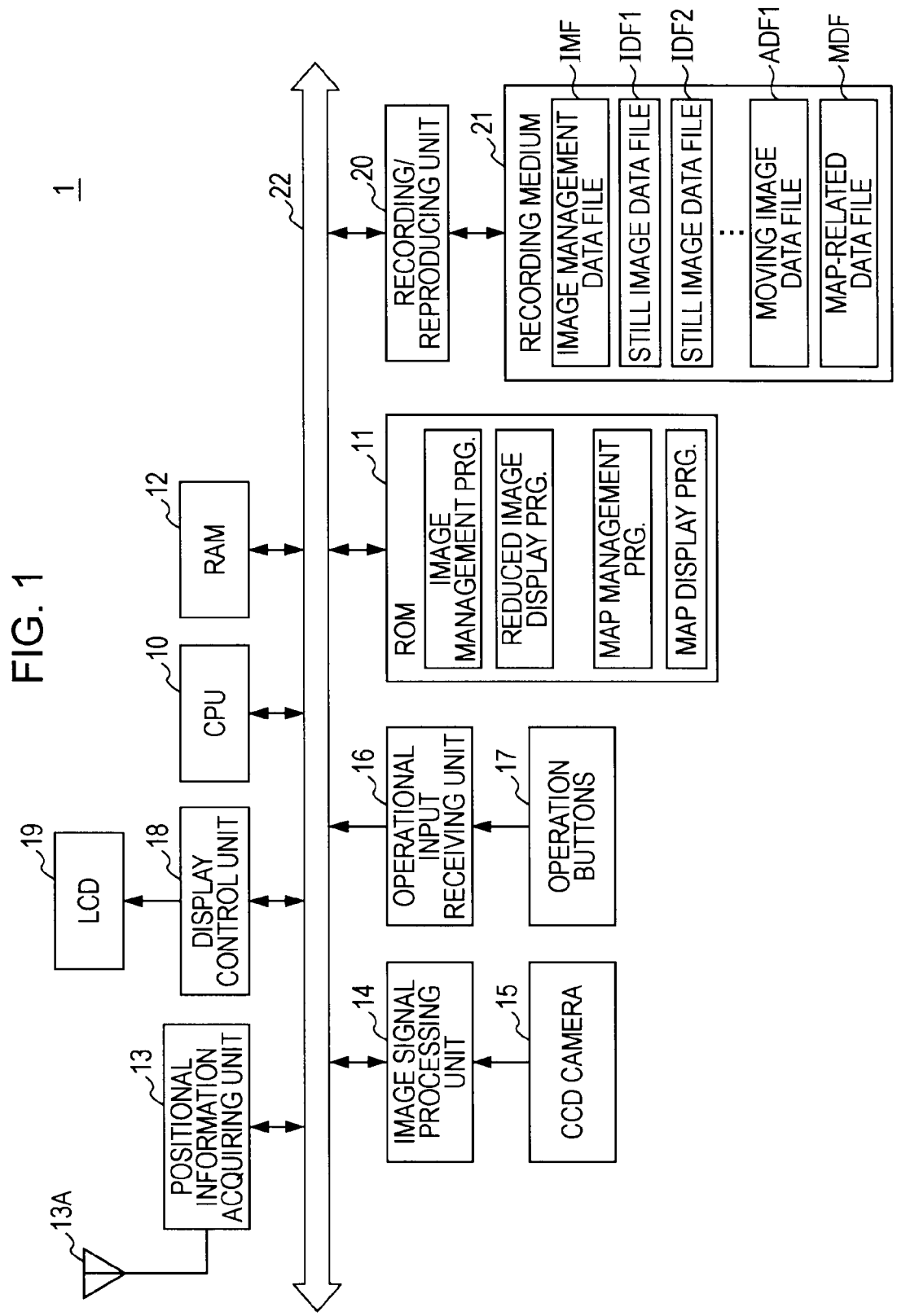
FIG. 1 is a block diagram showing the circuit configuration of a digital video camera.

Referring to FIG. 1, a digital video camera according to an embodiment of the present invention is generally denoted by reference numeral 1, in which a central processing unit (CPU) 10 controls all of the component units of the digital video camera 1 via a bus 22 to achieve various functions including a photographing function by a charge coupled device (CCD) camera 15 and recording/reproducing functions for a recording medium 21.

In the digital video camera 1, a basic program (not shown) and various programs are read out of a read only memory (ROM) 11 and developed in a random access memory (RAM) 12 to perform various processing to achieve various functions including the photographing function and recording/reproducing functions.

If the user depresses various operation buttons 17 provided on the surface of the main body (not shown) of the digital video camera 1, the commands corresponding to the depressed buttons 17 are received by an operational input reception unit 16 and recognized by the CPU 10.

When the CPU 10 recognizes that a photographing command was input by depressing an operation button 17, the CPU 10 controls the CCD camera 15 to photograph a still image or a moving image and send the acquired still image data or moving image data to an image signal processing unit 14.

The CPU 10 then controls the image signal processing unit 14 to perform predetermined processing, such as compression-encoding, on the still image data or moving image data.

At the same time, the CPU 10 causes a satellite signal from a global positioning system (GPS) satellite to be received via an antenna 13A and controls a positional information acquiring unit 13 including modules to analyze this signal and acquire positional information (latitude/longitude) of the photographing location at which the image was photographed by the CCD camera 15.

The CPU 10 can also cause the positional information acquiring unit 13 to acquire positional information (latitude/longitude) of the present location of the user, independently of the photographing location.

The CPU 10 then generates a reduced, thumbnail image of a predetermined size to be displayed in an index on the basis of the still image data, generates a still image data file IDF1, IDF2, . . . in which the reduced image is associated with the still image data, the photographing date and time, and positional information (latitude/longitude) of the photographing location, and sends the file IDF1, IDF2, . . . to a recording/reproducing unit 20.

Similarly, the CPU 10 generates a reduced, thumbnail image of a predetermine size of the first frame image to be displayed in an index on the basis of the moving image data, generates a moving image data file ADF1 in which the reduced image is associated with the moving image data, the photographing date and time, and positional information (latitude/longitude) of the photographing location, and sends this file ADF1 to the recording/reproducing unit 20.

The CPU 10 then controls the recording/reproducing unit 20 to record the still image data file IDF1, IDF2, . . . , or moving image data file ADF1 into the recording medium 21 such as a flash memory.

The CPU 10 also causes the recording/reproducing unit 20 to read the still image data file IDF1, IDF2, . . . , or moving image data file ADF1 out of the recording medium 21 and reproduce the corresponding image.

The CPU 10 manages the still image data files IDF1, IDF2, . . . , and moving image data file ADF1 recorded in the recording medium 21 in a folder.

The CPU 10 then controls a display control unit 18 to display on a liquid crystal display (LCD) 19 an image reproduced from the still image data file IDF1, IDF2, . . . , or moving image data file ADF1 read out of the recording medium 21. The CPU 10 also enables the LCD 19 to be used as a view finder when images are photographed.

Figure 2:
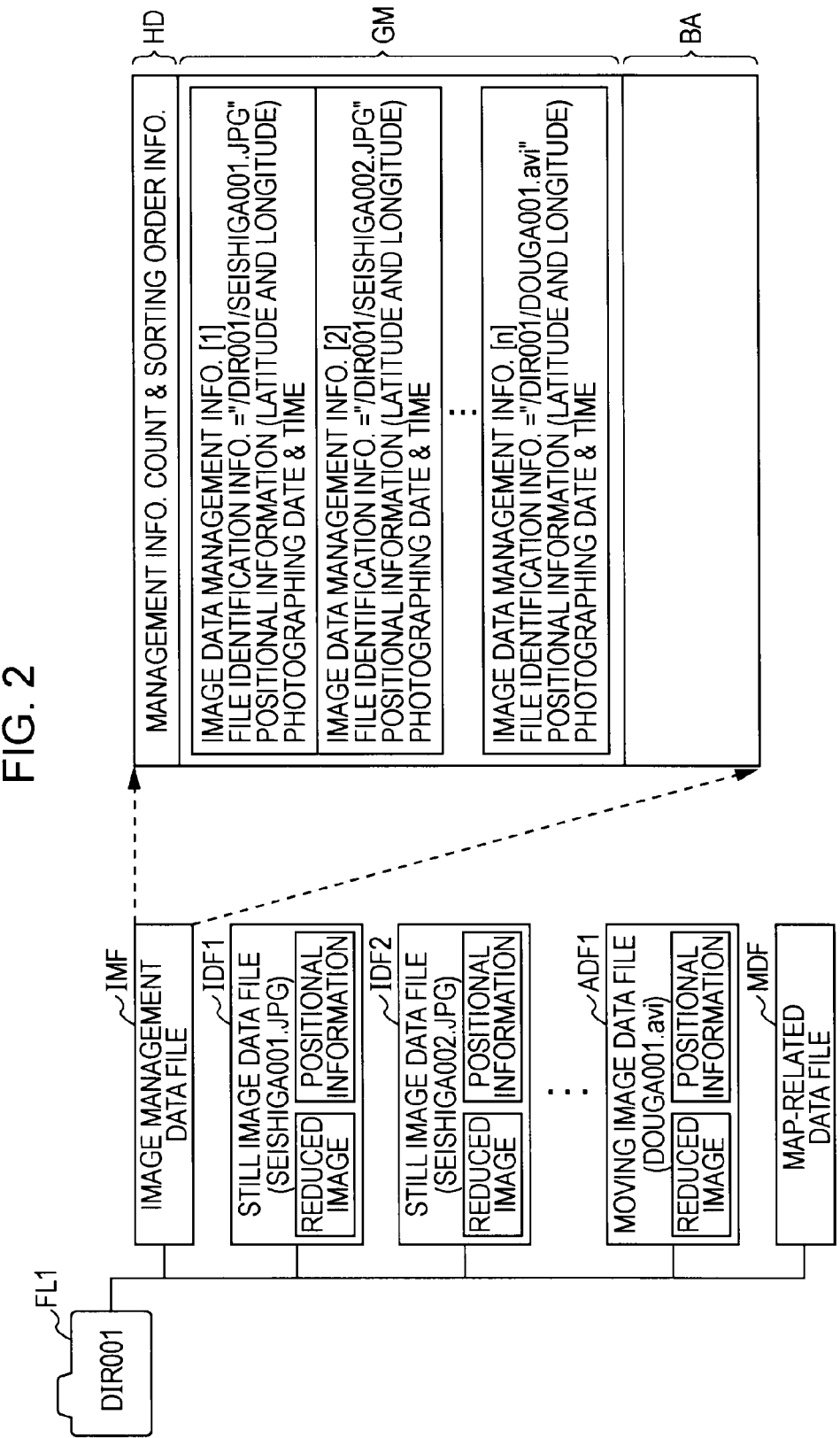
FIG. 2 is a schematic illustration of the folder configuration and the structure of an image management data file.

As shown in FIG. 2, a folder FL1 named "DIR001" is generated in the recording medium 21, in which a still image data file IDF1 named "SEISHIGA001.JPG", a still image data file IDF2 named "SEISHIGA002.JPG", . . . , and a moving image data file ADF1 named "DOUGA001.avi" are stored.

In the recording medium 21, an image management data file IMF generated by the CPU 10 is also stored to manage the still image data files IDF1, IDF2, moving image data file ADF1, etc.

In the still image data file IDF1 named "SEISHIGA001.JPG", the still image data of a still image photographed by the CCD camera 15, positional information (latitude/longitude) of the photographing location acquired by the positional information acquiring unit 13, a reduced image, etc. are associated with each other.

Similarly, in the still image data file IDF2 named "SEISHIGA002.JPG", the still image data of a still image photographed by the CCD camera 15, positional information (latitude/longitude) of the photographing location acquired by the positional information acquiring unit 13, a reduced image, etc. are associated with each other.

In the moving image data file ADF1 named "DOUGA001.avi", the moving image data of a moving image photographed by the CCD camera 15, positional information (latitude/longitude) of the photographing location acquired by the positional information acquiring unit 13, a reduced image of the first frame forming part of the moving image data, etc. are associated with each other.

The image management data file IMF includes a header section HD, image data management section GM, and free space BA. The header section HD stores various information including the number of management information items regarding the still image data files IDF1, IDF2, . . . , and moving image data file ADF1, etc. managed by the image management data file IMF, as well as the order information indicating the order (order of photographing date and time, for example) in which the files are arranged and managed.

The image data management section GM stores image data management information [1] for the still image data file IDF1, image data management information [2] for still image data file IDF2, . . . , and image data management information [n] for the moving image data file ADF1.

For example, the image data management information [1] includes file identification information "/DIR001/SEISHIGA001.JPG" for identifying the still image data file IDF1, positional information (latitude/longitude) for identifying the photographing location, photographing date and time, etc.

Similarly, the image data management information [2] includes file identification information "/DIR001/SEISHIGA002.JPG" for identifying the still image data file IDF2, positional information (latitude/longitude) for identifying the photographing location, photographing date and time, etc.

The image data management information [n] includes the file identification information "/DIR001/DOUGA001.avi" for identifying the moving image data file ADF1, positional information (latitude/longitude) for identifying the photographing location, photographing date and time, etc.

The free space BA can be used freely by the user and may be used to store the reduced images of the still image data files IDF1, IDF2, ..., moving image data file ADF1, etc.

In the recording medium 21, a map-related data file MDF is stored in the folder FL1 named "DIR001". When a map image is drawn, the CPU 10 reads the map-related data file MDF and uses map-related data included in the map-related data file MDF to draw the map image.

[1-2. Latitudinally/Longitudinally-Ordered Index Display Processing Procedure]

In the digital video camera 1 according to this embodiment of the present invention, reduced, thumbnail images generated from the still image data and moving image data captured by the CCD camera 15 are displayed in an index in latitudinal or longitudinal order according to an application program. The latitudinally or longitudinally-ordered index display processing procedure will now be described.

Figure 3:
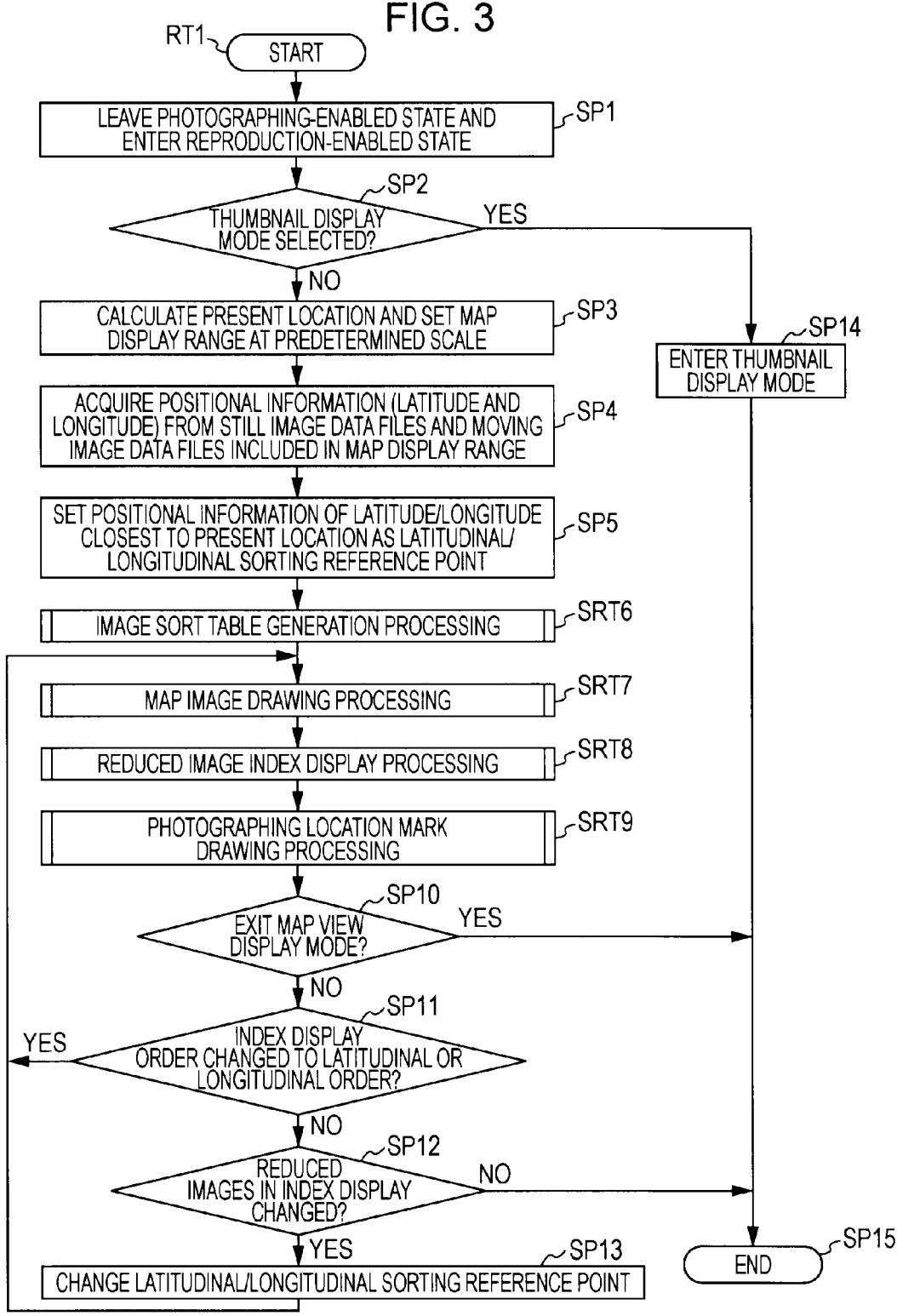
FIG. 3 is a flowchart illustrating a latitudinally/longitudinally-ordered index display processing procedure.

As shown in FIG. 3, the CPU 10 enters the routine RT1 through the START step and proceeds to the next step SP1, according to an application program.

In step SP1, the CPU 10 leaves the photographing-enabled state upon power-on in which the CCD camera 15 can photograph images and enters the reproduction-enabled state in which images can be reproduced from the recording medium 21 in response to button operations by the user, and then proceeds to the next step SP2.

In step SP2, the CPU 10 in the reproduction-enabled state determines whether or not a thumbnail display mode is selected from a menu screen (not shown) to display the reproducible still image data or moving image data as a thumbnail image.

If NO in step SP2, indicating that the thumbnail display mode is not selected, but a map view display mode (described later) according to this embodiment of the present invention is selected from the menu screen (not shown), the CPU 10 proceeds to the next step SP3.

In step SP3, the CPU 10 controls the positional information acquiring unit 13 to calculate the present location (latitude/longitude) of the digital video camera 1, then sets a map display range (for example, 200 m in radius) at a predetermined scale centered around the present location, and proceeds to the next step SP4.

In step SP4, the CPU 10 refers to the image management data file IMF (FIG. 2), acquires positional information (latitude/longitude) from the still image data files IDF1, IDF2, ..., and moving image data file ADF1 included in the map display range of the image management data file IMF, and then proceeds to the next step SP5.

If the CPU 10 recognizes that the still image data file IDF1, for example, includes the positional information (latitude/longitude) closest to the present user location (latitude/longitude) calculated in step SP3, the CPU 10 sets this positional information as the latitudinal/longitudinal sorting reference point in step SP5, and then proceeds to the next subroutine SRT6.

In subroutine SRT6, the CPU 10 generates an image sort table (described later) that is used to display the reduced images retrieved from the still image data files IDF1, IDF2, ..., and moving image data file ADF1 in latitudinal or longitudinal order in the index.

Figure 4:
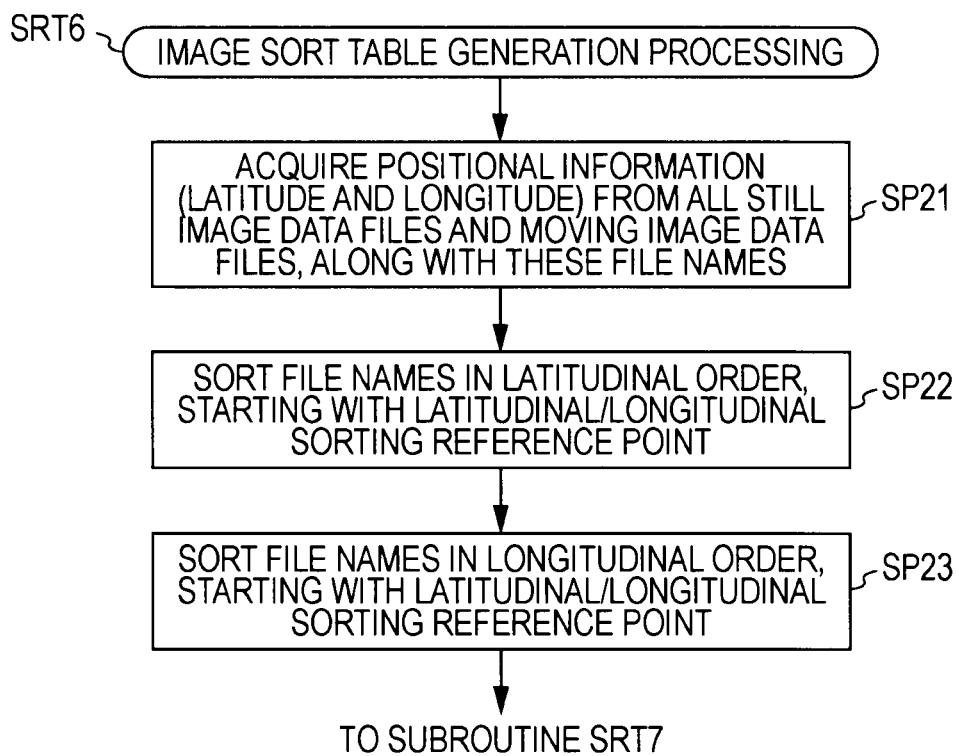
FIG. 4 is a flowchart illustrating a subroutine for an image sort table generation processing procedure.

As shown in FIG. 4, the CPU 10 proceeds to step SP21 in the subroutine SRT6 to acquire positional information (latitude/longitude) from all of the still image data files IDF1, IDF2, ..., and moving image data file ADF1 stored in the recording medium 21, along with these file names, and then proceeds to the next step SP22.

Figure 5:
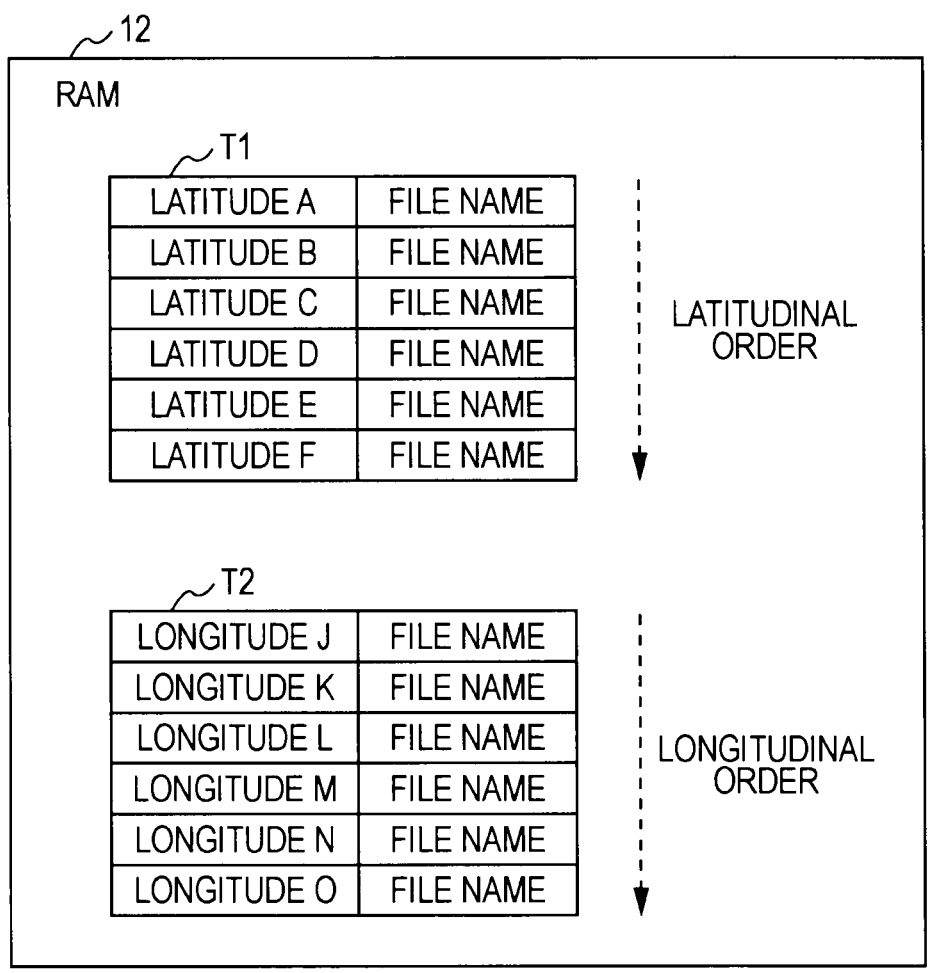
FIG. 5 is a schematic illustration of an image sort table.

In step SP22, the CPU 10 sorts these file names in latitudinal order starting with the latitudinal/longitudinal sorting reference point set in step SP5. The CPU 10 then generates a latitudinally sorted table T1 as shown in FIG. 5 and holds this table T1 in the RAM 12, and then proceeds to the next step SP23.

In this latitudinally sorted table T1, the file names of the still image data files IDF1, IDF2 and moving image data file ADF1 are arranged in latitudinal order, starting with the latitude A that is the latitudinal/longitudinal sorting reference point, followed by latitude B, latitude C, ..., for example.

In step SP23, the CPU 10 sorts the file names in longitudinal order starting with the latitudinal/longitudinal sorting reference point set in step SP5. The CPU 10 then generates a longitudinally sorted table T2 (FIG. 5) and holds this table T2 in the RAM 12, and then proceeds to the next subroutine SRT7 (FIG. 3).

In the longitudinally sorted table T2, the file names of the still image data files IDF1, IDF2 and moving image data file ADF1 are arranged in longitudinal order, starting with the longitude J that is the latitudinal/longitudinal sorting reference point, followed by longitude K, longitude L, ..., for example.

The CPU 10 sorts here in latitudinal order in step SP22 and then in longitudinal order in step SP23, but the embodiment of the present invention is not limited to this order. For example, the CPU 10 may sort in the reverse order, sorting first in longitudinal order in step SP22 and then in latitudinal order in step SP23, or may sort in latitudinal and longitudinal orders at the same time.

In subroutine SRT7, the CPU 10 draws a map image of the map display range set in step SP3.

Figure 6:
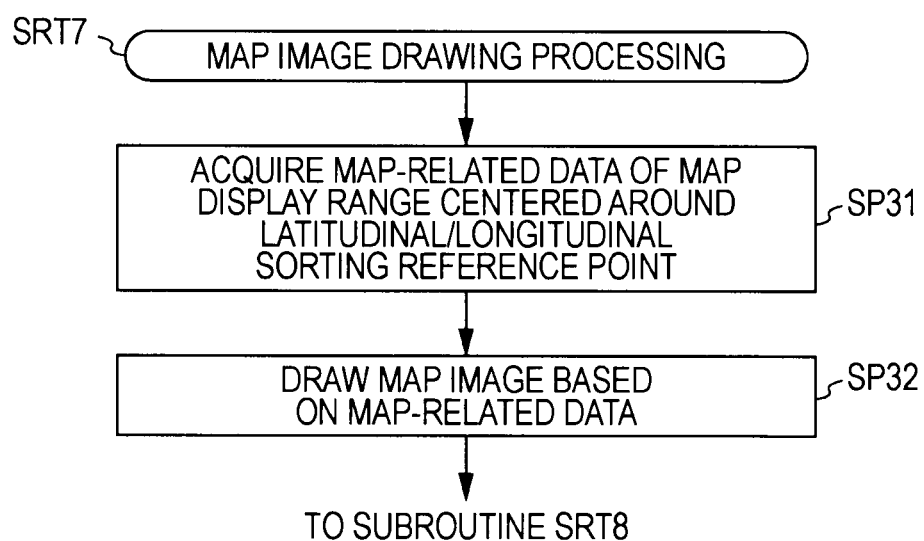
FIG. 6 is a flowchart illustrating a subroutine for a map image display processing procedure.

As shown in FIG. 6, the CPU 10 proceeds to step SP31 in the subroutine SRT7 to read and acquire from the map-related data file MDF map-related data corresponding to the map display range (200 m in radius) centered around the latitudinal/longitudinal sorting reference point set in step SP5, and then proceeds to the next step SP32.

Figure 7:
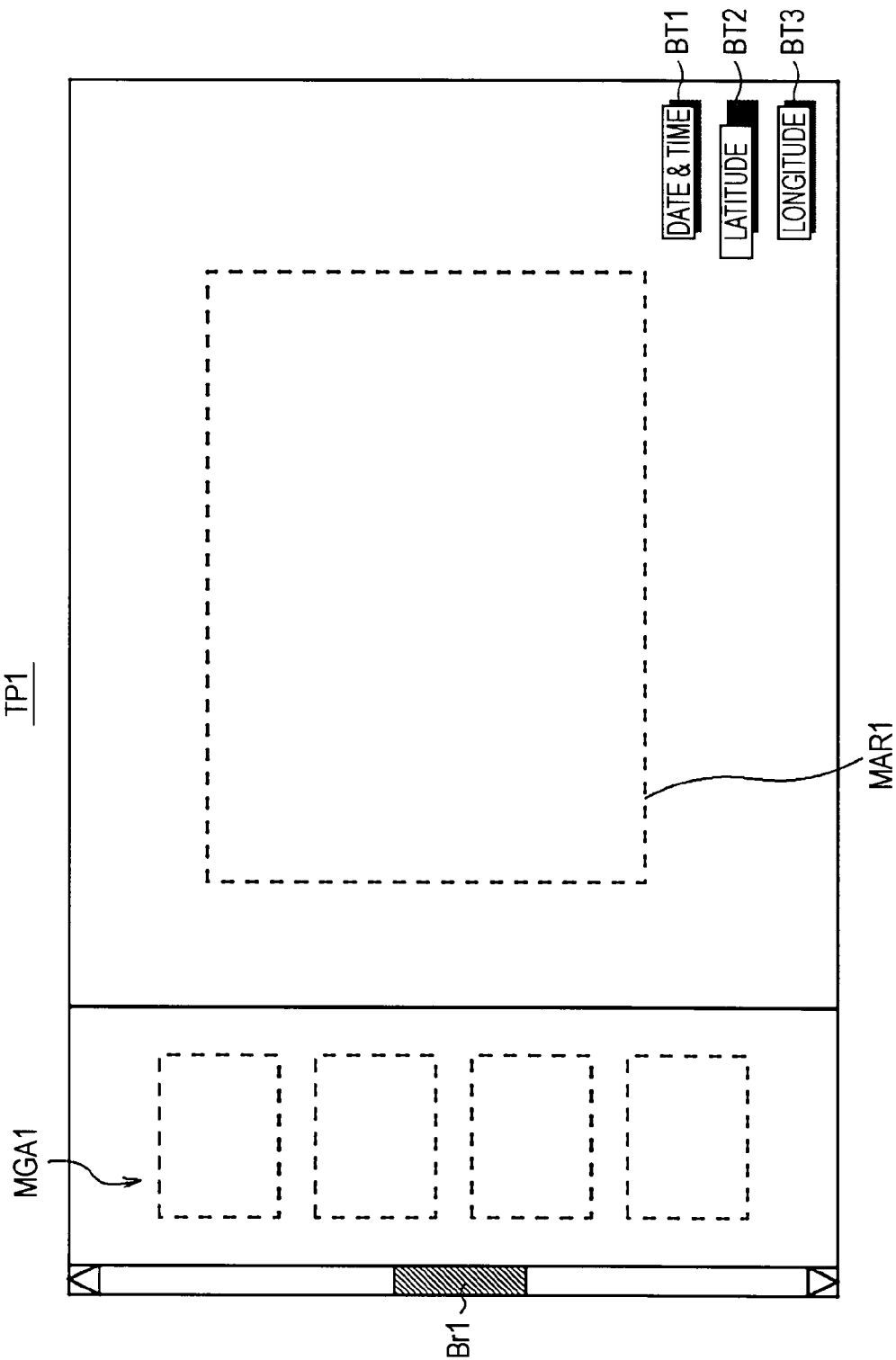
FIG. 7 is a schematic illustration of a template for generating a latitudinally-ordered map view screen.
Figure 8:
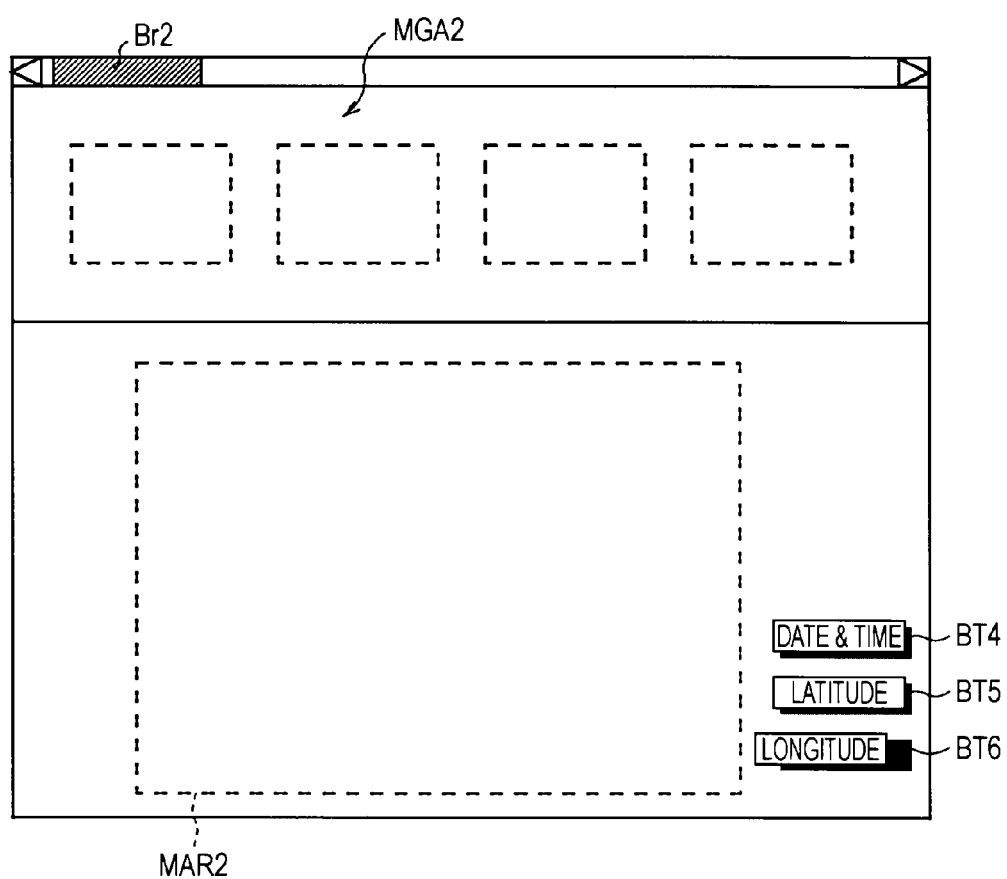
FIG. 8 is a schematic illustration of a template for generating a longitudinally-ordered map view screen.

In step SP32, the CPU 10 draws a map image based on the map-related data in the map-related data file MDF in a map image display area MAR1 of a template TP1 for the map view screen displaying a latitudinally-ordered index as shown in FIG. 7, or in a map image display area MAR2 of a template TP2 for the map view screen displaying a longitudinally-ordered index as shown in FIG. 8.

In this manner, the CPU 10 can draw a map image of the map display range (200 m in radius) centered around the latitudinal/longitudinal sorting reference point, in the map image display area MAR1 of the template TP1 or in the map image display area MAR2 of the template TP2.

Figure 9:
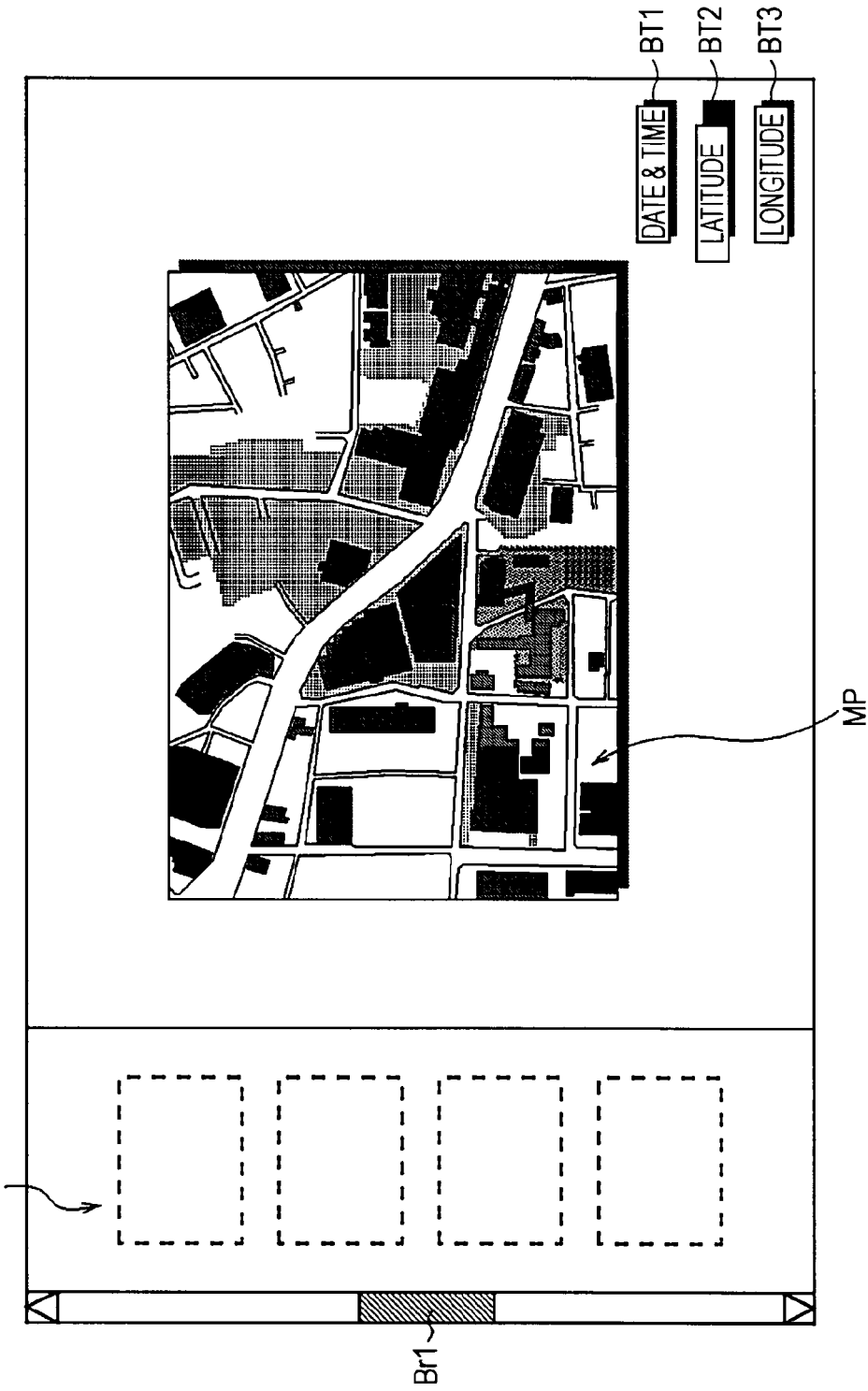
FIG. 9 is a schematic illustration of a latitudinally-ordered map view screen partially completed with only a map image drawn.
Figure 10:
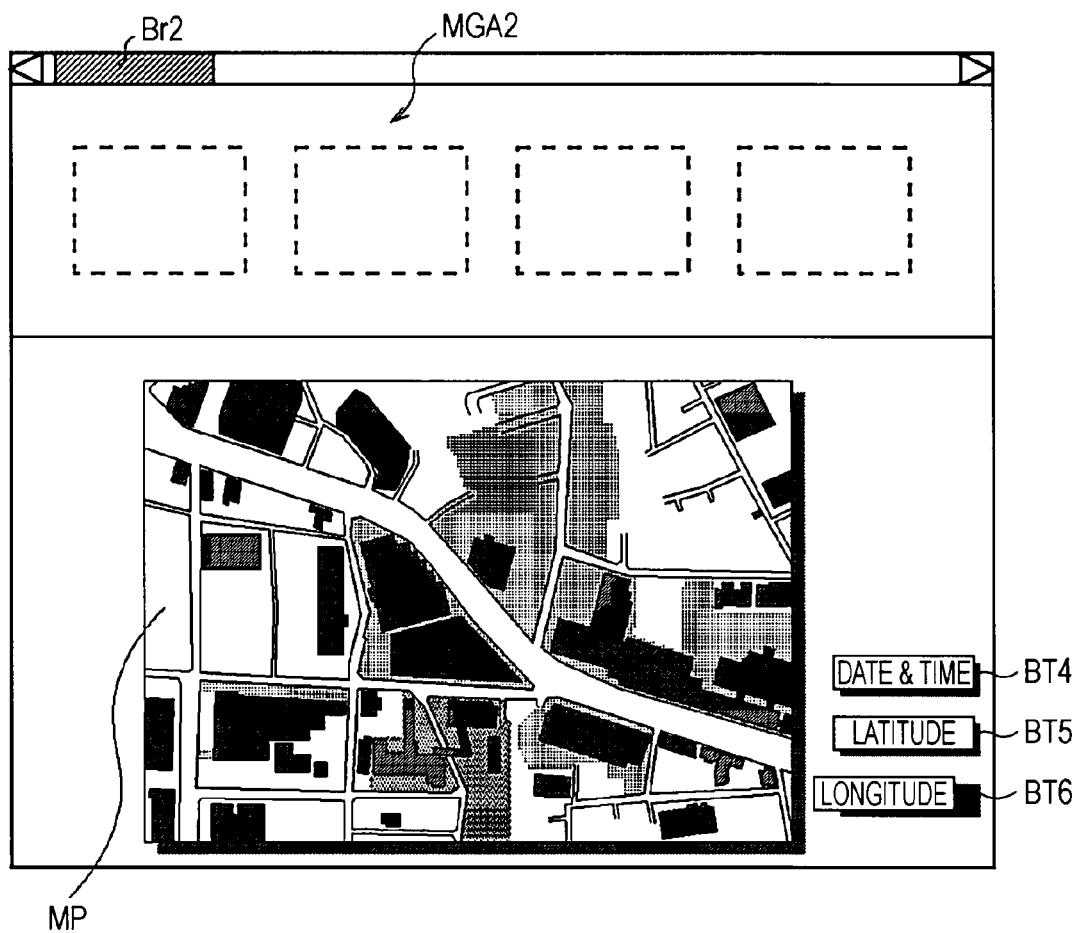
FIG. 10 is a schematic illustration of a longitudinally-ordered map view screen partially completed with only a map image drawn.

Consequently, the CPU 10 can generate a longitudinally-ordered map view screen MV1a partially completed with only the map image MP drawn as shown in FIG. 9, or a latitudinally-ordered map view screen MV2a partially completed with only the map image MP drawn as shown in FIG. 10, and then proceeds to the next subroutine SRT8 (FIG. 3).

Consequently, the map image MP of the map display range (200 m in radius) centered around the latitudinal/longitudinal sorting reference point closest to the present location of the user carrying the digital video camera 1 is displayed on the map view screen MV1a (FIG. 9) or MV2a (FIG. 10).

In the templates TP1 (FIG. 7) and TP2 (FIG. 8), reduced image pasting areas MGA1, MGA2 are provided to paste the reduced images to be displayed in the index.

More specifically, in the template TP1 (FIG. 7) for displaying the latitudinally-ordered index, the reduced images are vertically arranged in the reduced image pasting area MGA1. In the template TP2 (FIG. 8) for displaying the longitudinally-ordered index, the reduced images are horizontally arranged in the reduced image pasting area MGA2.

In the template TP1 (FIG. 7), a scroll bar Br1 for changing images displayed in the reduced image pasting area MGA1 is provided at the leftmost end, while in the template TP2 (FIG. 8), a scroll bar Br2 for changing images displayed in the reduced image pasting area MGA2 is provided at the uppermost end.

In the template TP1 (FIG. 7), a date & time button BT1 for displaying the index in the order of photographing date and time, a latitude button BT2 for displaying the index in latitudinal order, and a longitude button BT3 for displaying the index in longitudinal order are also provided.

Similarly, in the template TP2 (FIG. 8), a date & time button BT4 for displaying the index in the order of photographing date and time, a latitude button BT5 for displaying the index in latitudinal order, and a longitude button BT6 for displaying the index in longitudinal order are provided.

In the subroutine SRT8, the CPU 10 displays in the reduced image pasting area MGA1 of the template TP1 an index of the reduced images retrieved from the still image data files IDF1, IDF2, . . . , and moving image data file ADF1 included in the map display range displayed in the map image MP.

Similarly, in the subroutine SRT8, the CPU 10 displays in the reduced image pasting area MGA2 of the template TP2 an index of the reduced images retrieved from the still image data files IDF1, IDF2, . . . , and moving image data file ADF1 included in the map display range displayed in the map image MP.

Figure 11:
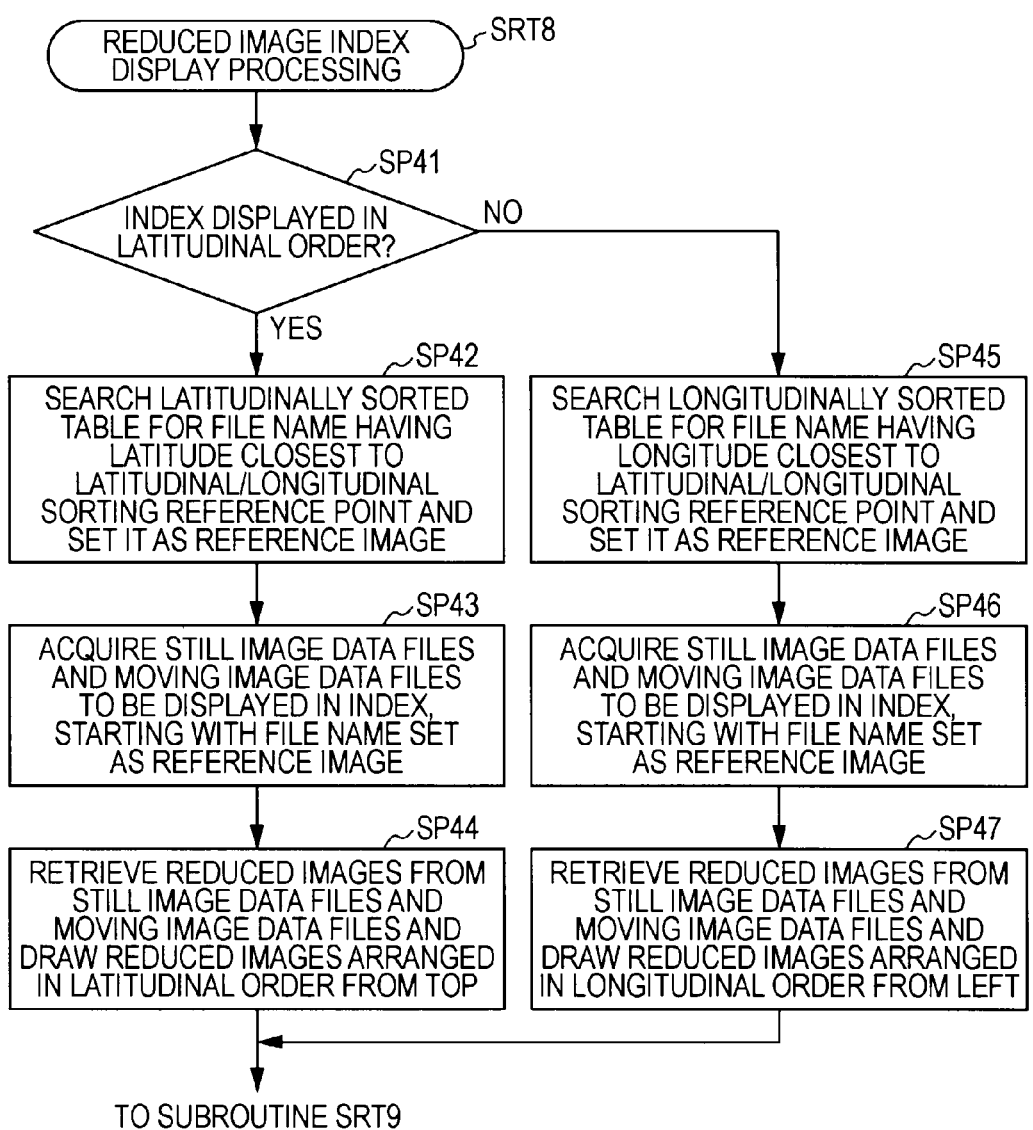
FIG. 11 is a flowchart illustrating a subroutine for a reduced image index display processing procedure.

As shown in FIG. 11, the CPU 10 proceeds to step SP41 in the subroutine SRT8 and determines whether or not the latitudinal order is set as the index display order in the reduced image pasting area MGA1 or MGA2 of the map view screen MV1a (FIG. 9) or MV2a (FIG. 10).

If YES in step SP41, indicating that the latitude button BT2 in the map view screen MV1a (FIG. 9) or the latitude button BT5 in the map view screen MV2a (FIG. 10) is selected, the CPU 10 proceeds to the next step SP42.

In step SP42, the CPU 10 searches the latitudinally sorted table T1 (FIG. 5) for a file name including the latitude closest to the latitudinal/longitudinal sorting reference point and sets the reduced image in this file as the reference image that is displayed first in the index, and then proceeds to the next step SP43.

In step SP43, the CPU 10 retrieves from the recording medium 21 the still image data files IDF1, IDF2, . . . , and moving image data file ADF1 of the images to be displayed in the index, starting with the file name including the image set as the reference image, and then proceeds to the next step SP44.

In step SP44, the CPU 10 retrieves the reduced images to be displayed in the index from the still image data files IDF1, IDF2, . . . , and moving image data file ADF1.

Then, the CPU 10 pastes the reduced images retrieved from the still image data files IDF1, IDF2, . . . , and moving image data file ADF1 from top toward bottom in the reduced image pasting area MGA1 of the map view screen MV1a (FIG. 9) and then proceeds to the next subroutine SRT9 (FIG. 3).

Figure 12:
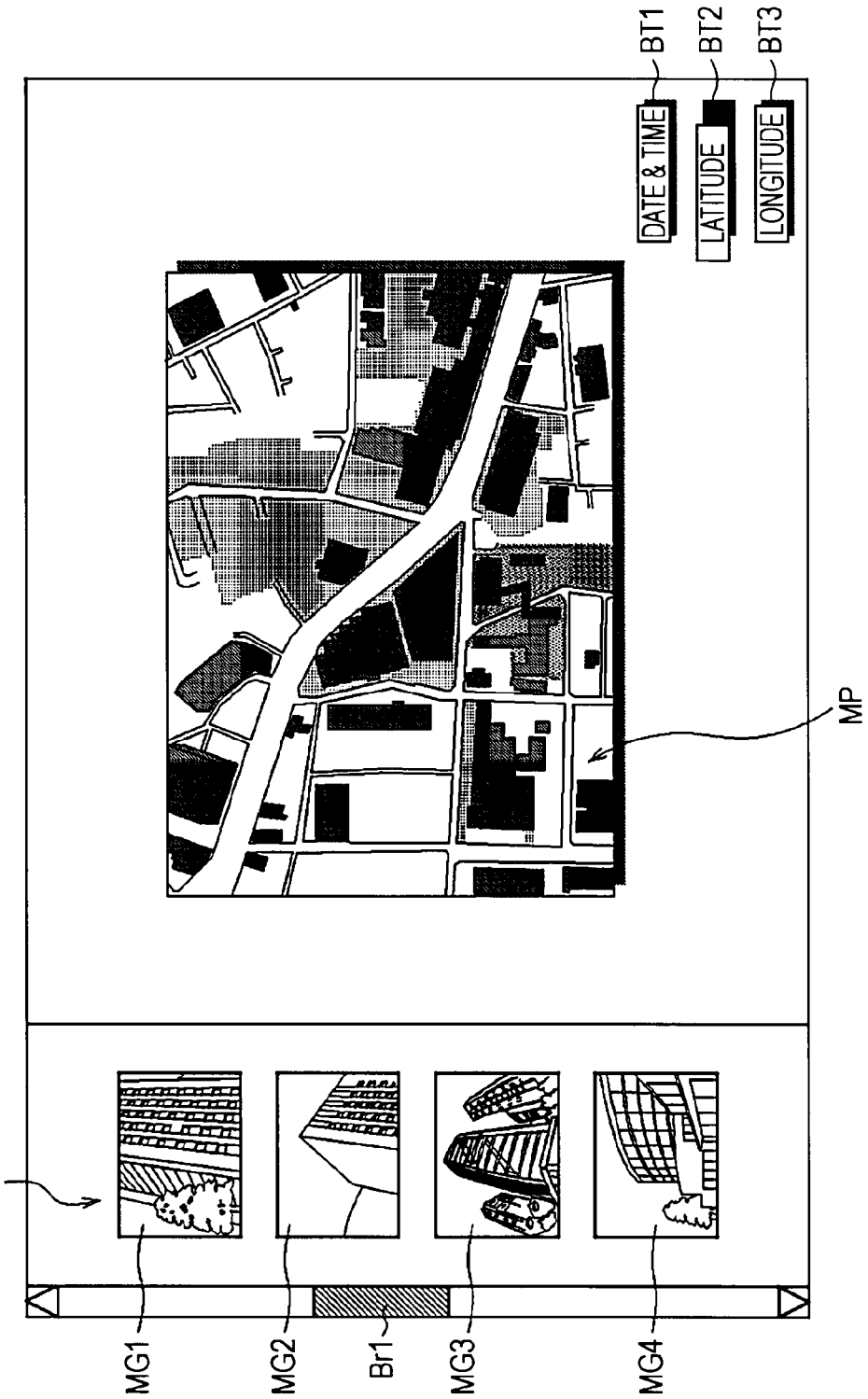
FIG. 12 is a schematic illustration of a latitudinally-ordered map view screen partially completed with only a map image and reduced images drawn.

In this manner, the CPU 10 generates a latitudinally-ordered map view screen MV1b partially completed with the map image MP drawn and the reduced images MG1, MG2, MG3, and MG4 arranged from top toward bottom in the reduced image pasting area MGA1 as shown in FIG. 12.

On the contrary, if NO in step SP41, that is, the longitude button BT3 in the map view screen MV1a or the longitude button BT6 in the map view screen MV2a is selected, indicating that the longitudinal order is set as the display order of the reduced images in the index, the CPU 10 proceeds to the next step SP45.

In step SP45, the CPU 10 searches the longitudinally sorted table T2 (FIG. 5) for a file name including the longitude closest to the latitudinal/longitudinal sorting reference point and sets the reduced image retrieved from this file as the reference image that is displayed first in the index, and then proceeds to the next step SP46.

In step SP46, the CPU 10 retrieves from the recording medium 21 the still image data files IDF1, IDF2, . . . , and moving image data file ADF1 of the images to be displayed in the index, starting with the file name including the image set as the reference image, and then proceeds to the next step SP47.

In step SP47, the CPU 10 retrieves the reduced images to be displayed in the index from the still image data files IDF1, IDF2, . . . , and moving image data file ADF1.

Then, the CPU 10 pastes the reduced images retrieved from the still image data files IDF1, IDF2, . . . , and moving image data file ADF1 from left toward right in the reduced image pasting area MGA2 of the map view screen MV2a (FIG. 10), and then proceeds to the next subroutine SRT9 (FIG. 3).

Figure 13:
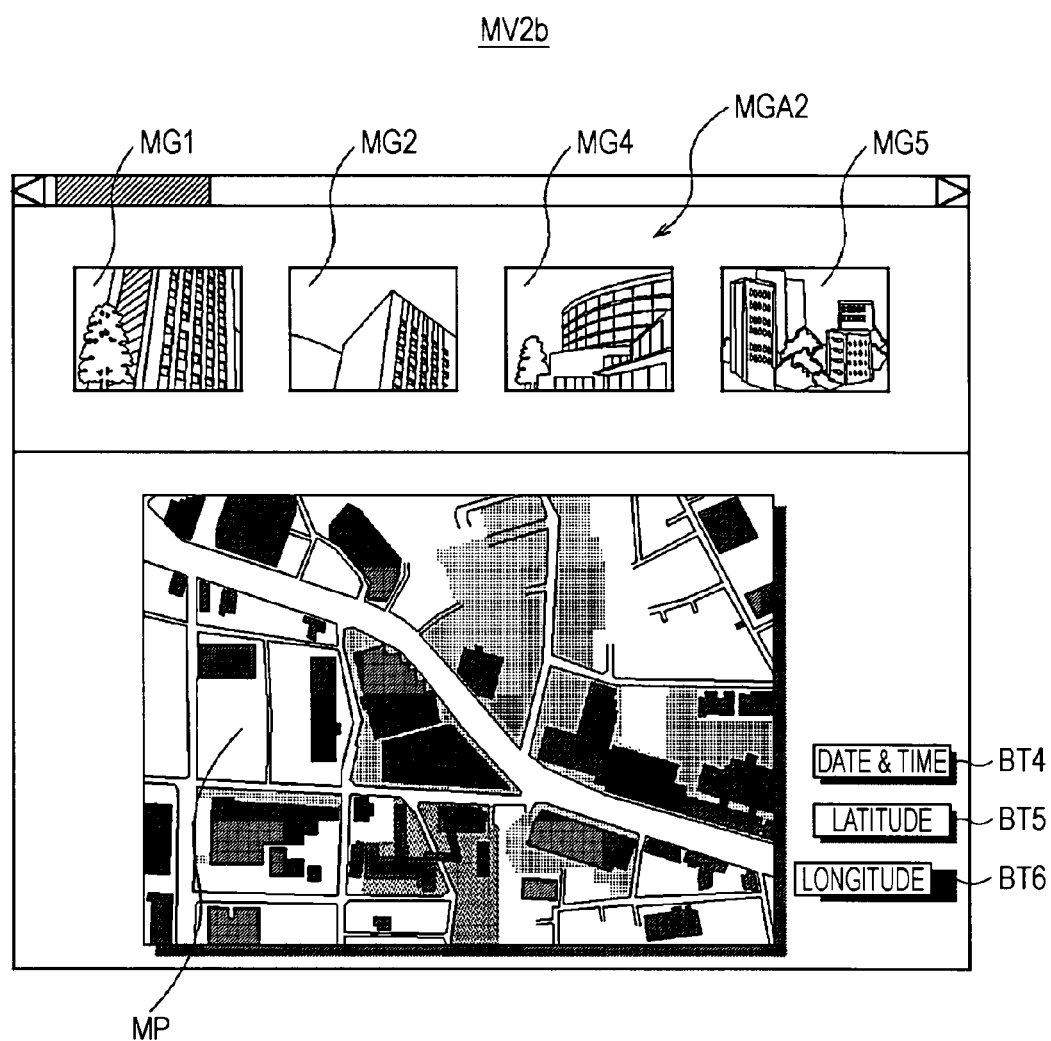
FIG. 13 is a schematic illustration of a longitudinally-ordered map view screen partially completed with only a map image and reduced images drawn.

In this manner, the CPU 10 generates a longitudinally-ordered map view screen MV2b partially completed with the map image MP drawn and the reduced images MG1, MG2, MG4, and MG5 arranged from left toward right in the reduced image pasting area MGA2 as shown in FIG. 13.

In this case, only the reduced images MG1, MG2 and MG4 are displayed in both of the reduced image pasting areas MGA1, MGA2 of the latitudinally-ordered map view screen MV1b (FIG. 12) and longitudinally-ordered map view screen MV2b (FIG. 13).

In the subroutine SRT9, the CPU 10 draws photographing location marks (described later) in the map image MP of the map view screen MV1b (FIG. 12) or MV2b (FIG. 13), indicating the locations in the map corresponding to the reduced images MG1-MG5 displayed in the reduced image pasting area MGA1 or MGA2.

Figure 14:
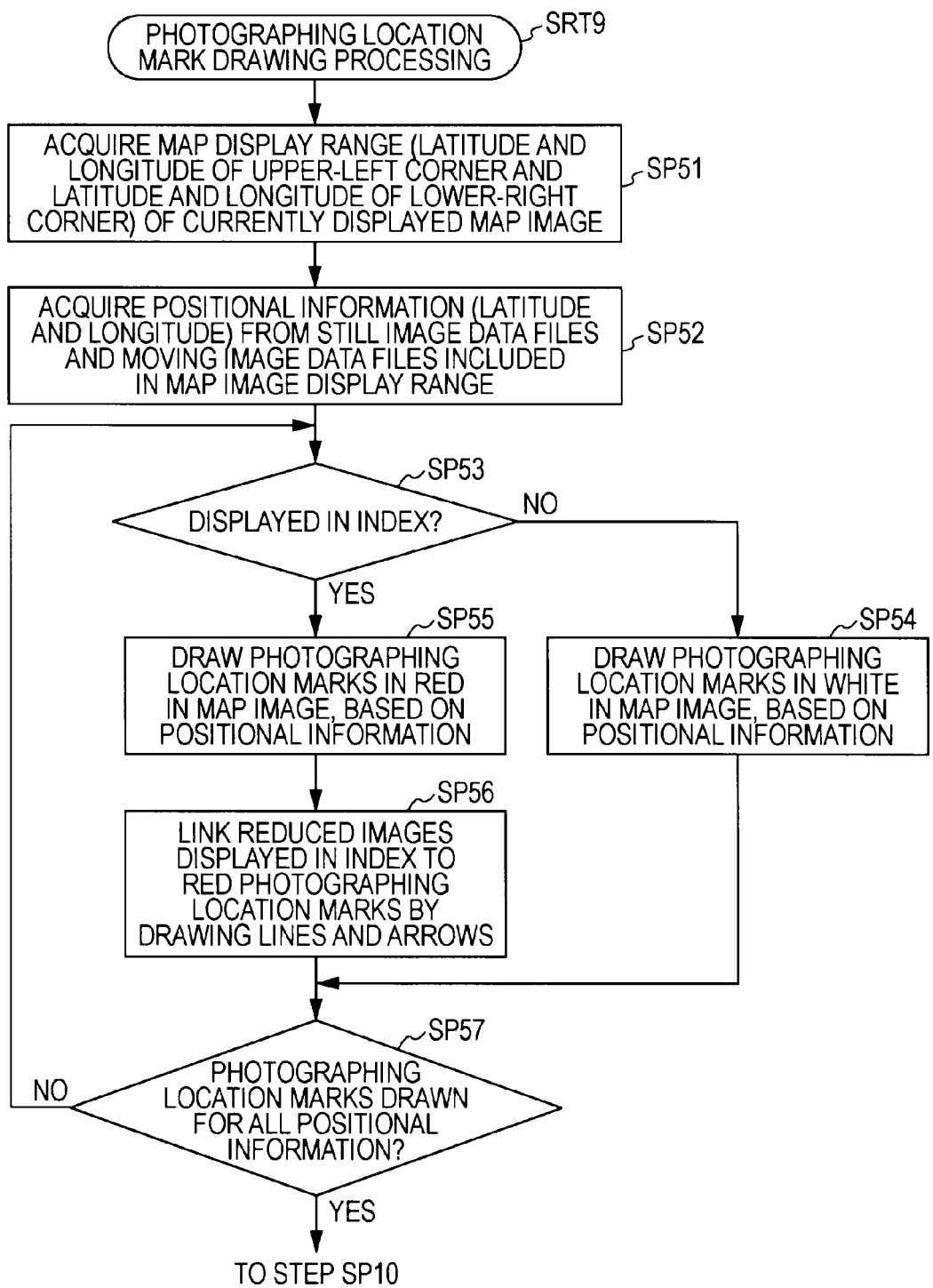
FIG. 14 is a flowchart illustrating a subroutine for a photographing location mark display processing procedure.

As shown in FIG. 14, the CPU 10 proceeds to the step SP51 in the subroutine SRT9. In step SP51, the CPU 10 reads out of the map-related data file MDF the map display range (latitude and longitude of the upper-left corner and latitude and longitude of the lower-right corner) of the currently displayed map image MP, and then proceeds to the next step SP52.

In step SP52, the CPU 10 retrieves positional information (latitude/longitude) from the still image data files IDF1, IDF2, . . . , and moving image data file ADF1 included in the map display range (latitude and longitude of the upper-left corner and latitude and longitude of the lower-right corner) of the map image MP, and then proceeds to the next step SP53.

In step SP53, the CPU 10 determines whether or not the first positional information (latitude/longitude) retrieved in step SP52 corresponds to any one of the reduced images MG1-MG5 displayed in the index in the reduced image pasting area MGA1 or MGA2.

If NO in step SP53, indicating that the positional information (latitude/longitude) does not correspond to any one of the reduced images MG1-MG5 displayed in the index in the reduced image pasting area MGA1 or MGA2, the CPU 10 proceeds to the next step SP54.

In other words, if NO in step SP53, the positional information (latitude/longitude) is outside the index range displayed in the reduced image pasting area MGA1 or MGA2, although included in the map range displayed in the map image MP.

Figure 15:
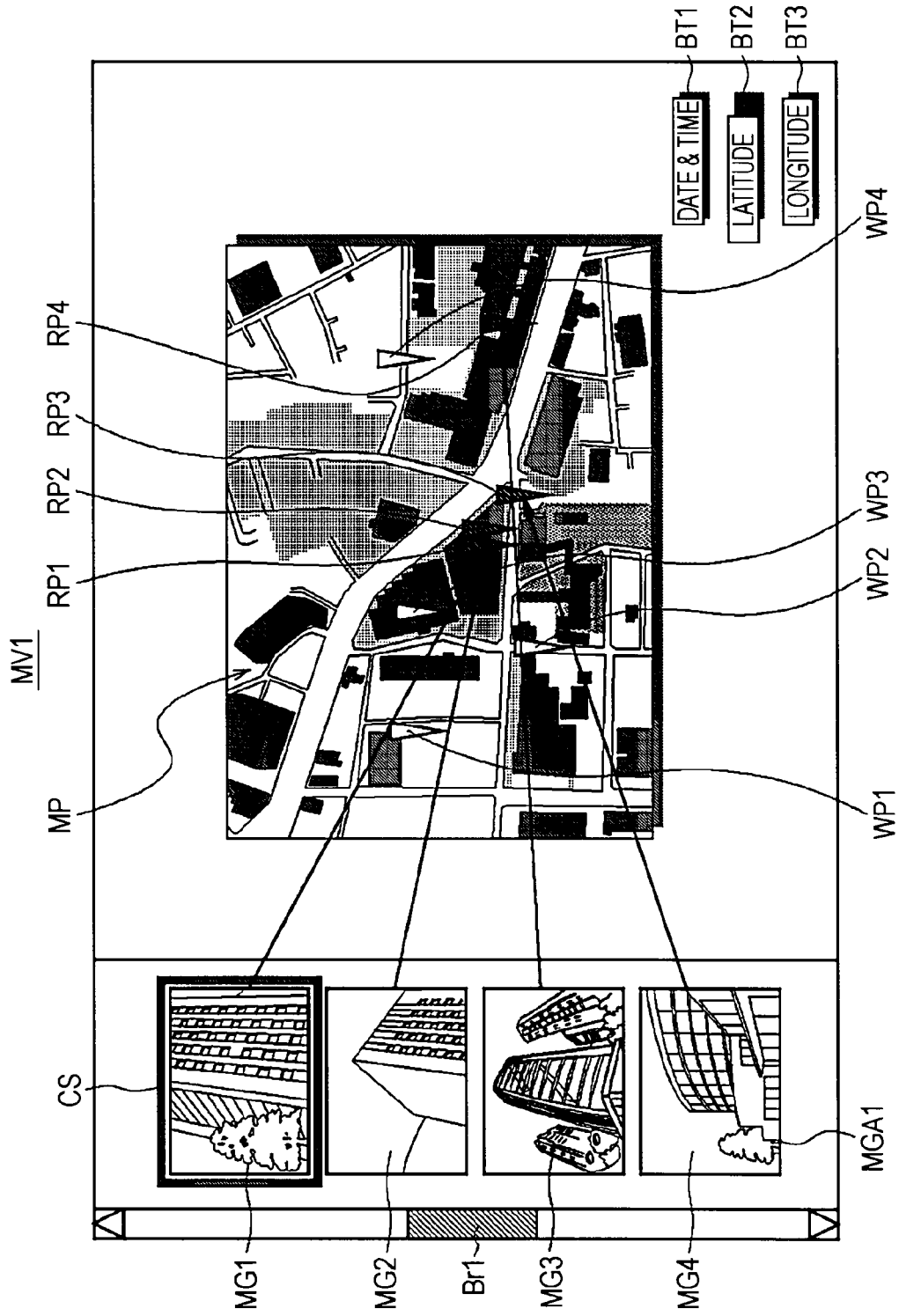
FIG. 15 is a schematic illustration of a latitudinally-ordered map view screen fully completed with a map image, reduced images, and photographing location marks all drawn.

If latitude is selected as the index display order, the CPU 10 draws, in step SP54, in the map image MP a white triangular photographing location mark WP1, for example, corresponding to this positional information as shown in FIG. 15, and then proceeds to the next step SP57.

Figure 16:
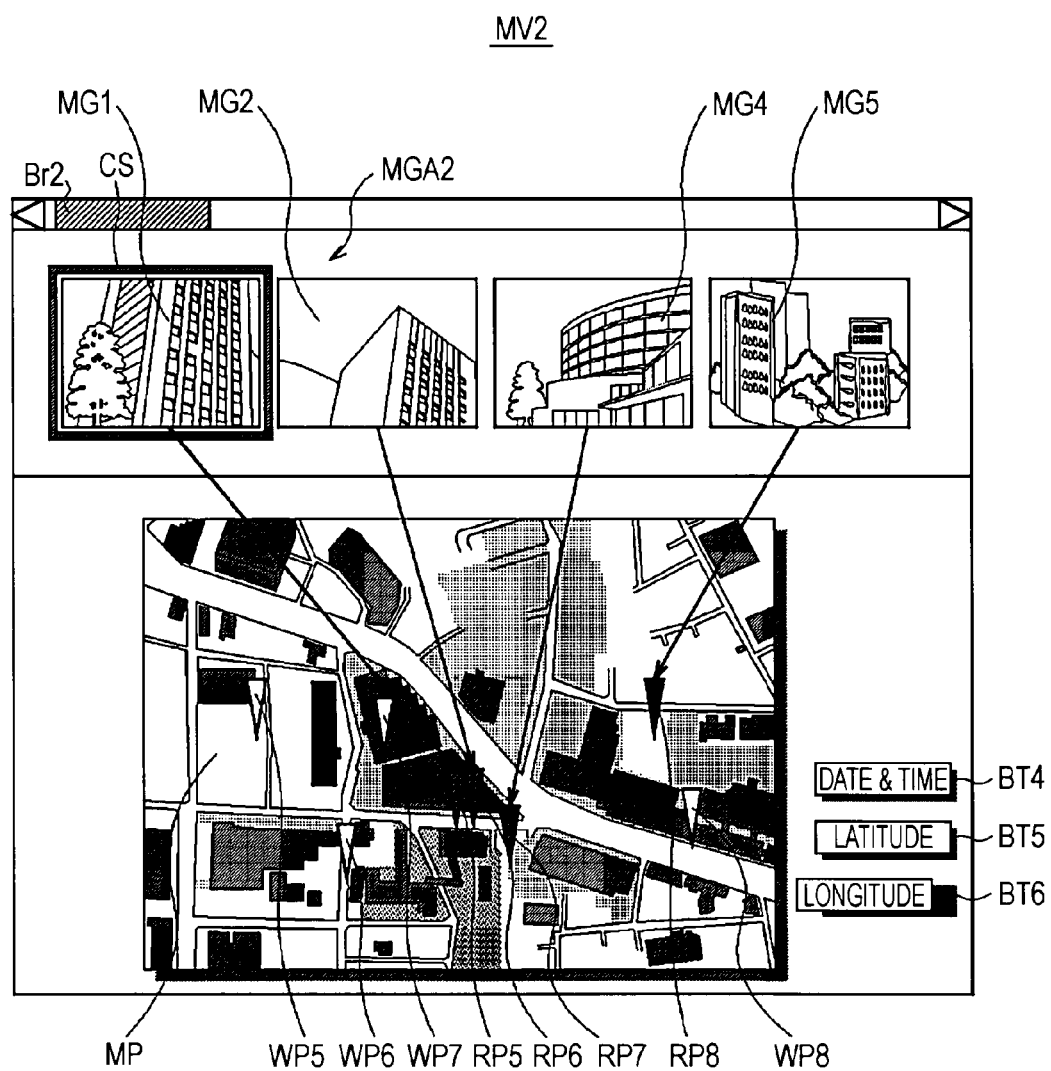
FIG. 16 is a schematic illustration of a longitudinally-ordered map view screen fully completed with a map image, reduced images, and photographing location marks all drawn.

If longitude is selected as the index display order as shown in FIG. 16, the CPU 10 draws, in step SP54, in the map image MP a white triangular photographing location mark WP5, for example, corresponding to this positional information, and then proceeds to the next step SP57. The photographing location mark WP1 is the same as the photographing location mark WP5.

On the contrary, if YES in step SP53, indicating that the positional information (latitude/longitude) corresponds to any one of the reduced images MG1-MG5 displayed in the index in the reduced image pasting area MGA1 or MGA2, the CPU 10 proceeds to the next step SP55.

In other words, if YES in step SP53, the positional information (latitude/longitude) is within the map range and also within the index range displayed in the reduced image pasting area MGA1 or MGA2.

If latitude is selected as the index display order as shown in FIG. 15, the CPU 10, in step SP55, draws in the map image MP a red triangular photographing location mark RP1, for example, corresponding to this positional information, and then proceeds to the next step SP56.

If longitude is selected as the index display order as shown in FIG. 16, the CPU 10, in step SP55, draws in the map image MP a red triangular photographing location mark RP5, for example, corresponding to this positional information, and then proceeds to the next step SP57. Again, the photographing location mark RP1 is the same as the photographing location mark RP5.

If latitude is selected as the index display order, the CPU 10, in step SP56, links the reduced image MG1, for example, displayed in an index in the reduced image pasting area MGA1 to the photographing location mark RP1 by drawing a line and an arrow as shown in FIG. 15, and then proceeds to the next step SP57.

If longitude is selected as the index display order, the CPU 10, in step SP56, links the reduced image MG1, for example, displayed in an index in the reduced image pasting area MGA2 to the photographing location mark RP5 by drawing a line and an arrow as shown in FIG. 16, and then proceeds to the next step SP57.

In step SP57, the CPU 10 determines whether or not photographing location marks WP, RP have been drawn for all the positional information (latitude/longitude) retrieved in step SP52.

If NO in step SP57, indicating that there remains one or more positional information (latitude/longitude) for which photographing location marks WP, RP have not been drawn, the CPU 10 returns back to step SP53 and repeats the processing above described.

If YES in step SP57, indicating that photographing location marks WP, RP have been drawn for all the positional information (latitude/longitude) retrieved in step SP52, the CPU 10 returns back to step SP10 (FIG. 3).

In this manner, if latitude is selected as the index display order, the CPU 10 can generate and display a latitudinally-ordered map view screen MV1 (FIG. 15) fully completed with the map image MP, reduced images MG1-MG4, and photographing location marks WP1-WP4, RP1-RP4 all drawn.

If longitude is selected as the index display order, the CPU 10 can generate and display a longitudinally-ordered map view screen MV2 (FIG. 16) fully completed with the map image MP, reduced images MG1, MG2, MG4, MG5, and photographing location marks WP5-WP8, RP5-RP8 all drawn.

The photographing location marks WP1, WP2, WP30 in the map view screen MV1 (FIG. 15) are the same as the photographing location marks WP5, WP6, WP7 in the map view screen MV2 (FIG. 16).

In addition, the photographing location marks RP1, RP2, RP3 in the map view screen MV1 (FIG. 15) are the same as the photographing location marks RP5, RP6, RP7 in the map view screen MV2 (FIG. 16).

This is because these reduced images MG are generated from common files, irrespective of the selected index display order being latitudinal or longitudinal.

However, the photographing location marks WP4 (FIG. 15) and RP8 (FIG. 16) are located at the same position but displayed in different colors, and the photographing location marks RP4 (FIG. 15) and WP8 (FIG. 16) are located at the same position but displayed in different colors.

This is because these reduced images MG are generated from different files depending on the selected index display order, i.e., latitudinal or longitudinal.

In this final map view screen MV1 (FIG. 15), the reduced image MG1 linked to the photographing location mark RP1 located approximately at the center of the map image MP is selected by default by a cursor CS.

In the final map view screen MV2 (FIG. 16), the reduced image MG1 linked to the photographing location mark RP5 located approximately at the center of the map image MP is selected by default by the cursor CS.

In step SP10, the CPU 10 determines whether or not a command was given for exiting the map view display mode in which the map view screen MV1 (FIG. 15) or MV2 (FIG. 16) is displayed.

If YES in step SP10, indicating that the command for exiting the map view display mode was given by the user through menu operation, the CPU 10 proceeds to step SP15 to complete the processing.

If NO in step SP10, indicating that the map view display mode continues, the CPU 10 proceeds to the next step SP11.

In step SP11, the CPU 10 determines whether or not the index display order in the reduced image pasting area MGA1 or MGA2 of the map view screen MV1 (FIG. 15) or MV2 (FIG. 16) is changed between the latitudinal and longitudinal orders.

If YES in step SP11, indicating that the command for changing the index display order was given by selecting the longitude button BT3 in the latitudinally-ordered map view screen MV1 or by selecting the latitude button BT5 in the longitudinally-ordered map view screen MV2, for example, the CPU 10 returns back to the subroutine SRT7 and repeats the processing described above.

If NO in step SP11, indicating that the command for changing the index display order in the map view screen MV1 (FIG. 15) or MV2 (FIG. 16) was not given, the CPU 10 proceeds to the next step SP12.

In step SP12, the CPU 10 determines whether or not a different reduced image is selected by the cursor CS, instead of the reduced image MG1 selected by default in the map view screen MV2 (FIG. 16).

Figure 17:
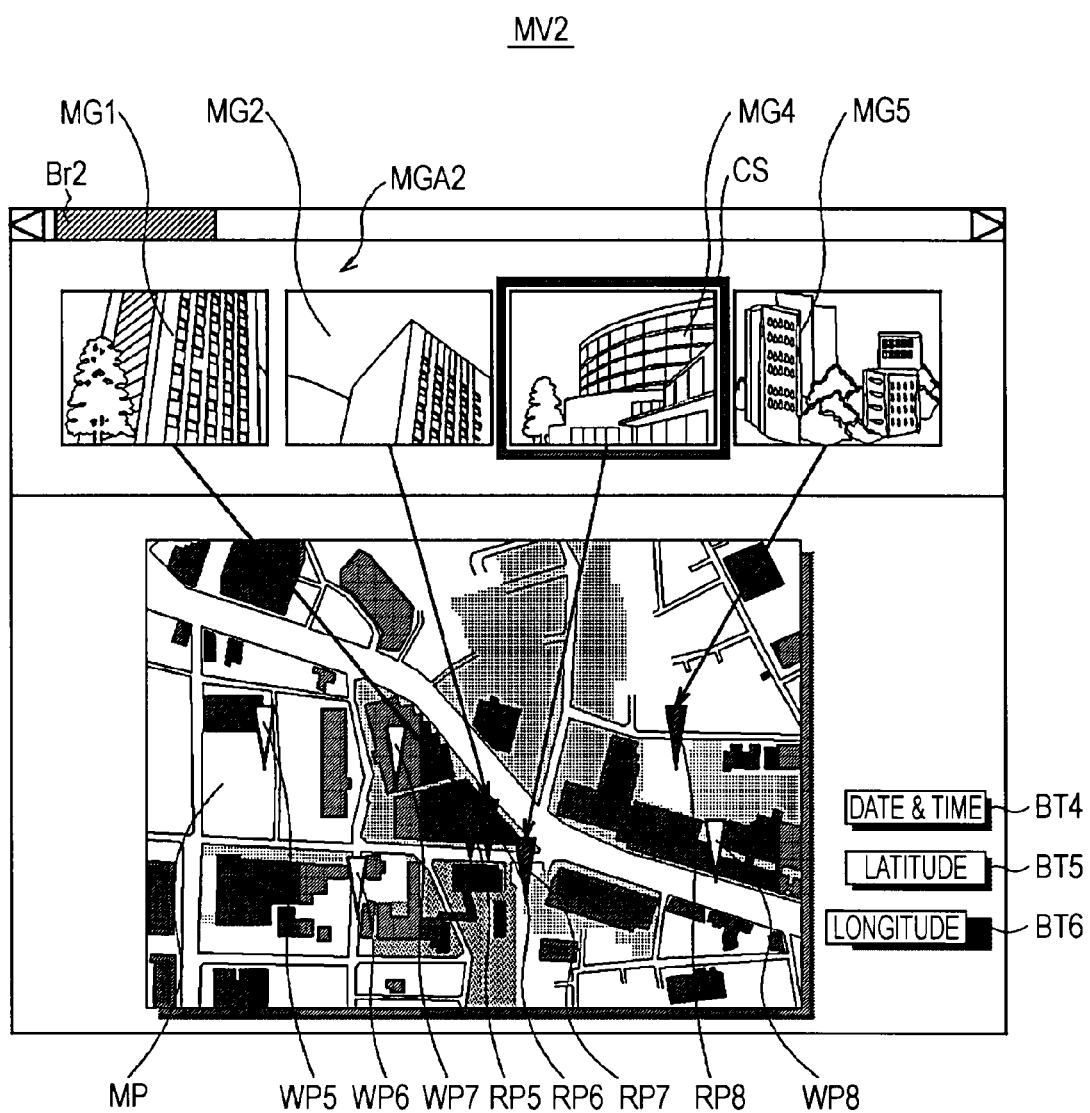
FIG. 17 is a schematic illustration of a longitudinally-ordered map view screen with a different image being selected.

There may be a case in which the reduced image MG4, for example, is selected by the cursor CS, instead of the reduced image MG1, as shown in FIG. 17.

There may also be a case in which the reduced images MG1, MG2, MG4 and MG5 displayed in the reduced image pasting area MGA2 are shifted by moving a scroll bar Br2 in the map view screen MV2 (FIG. 16).

Figure 18:
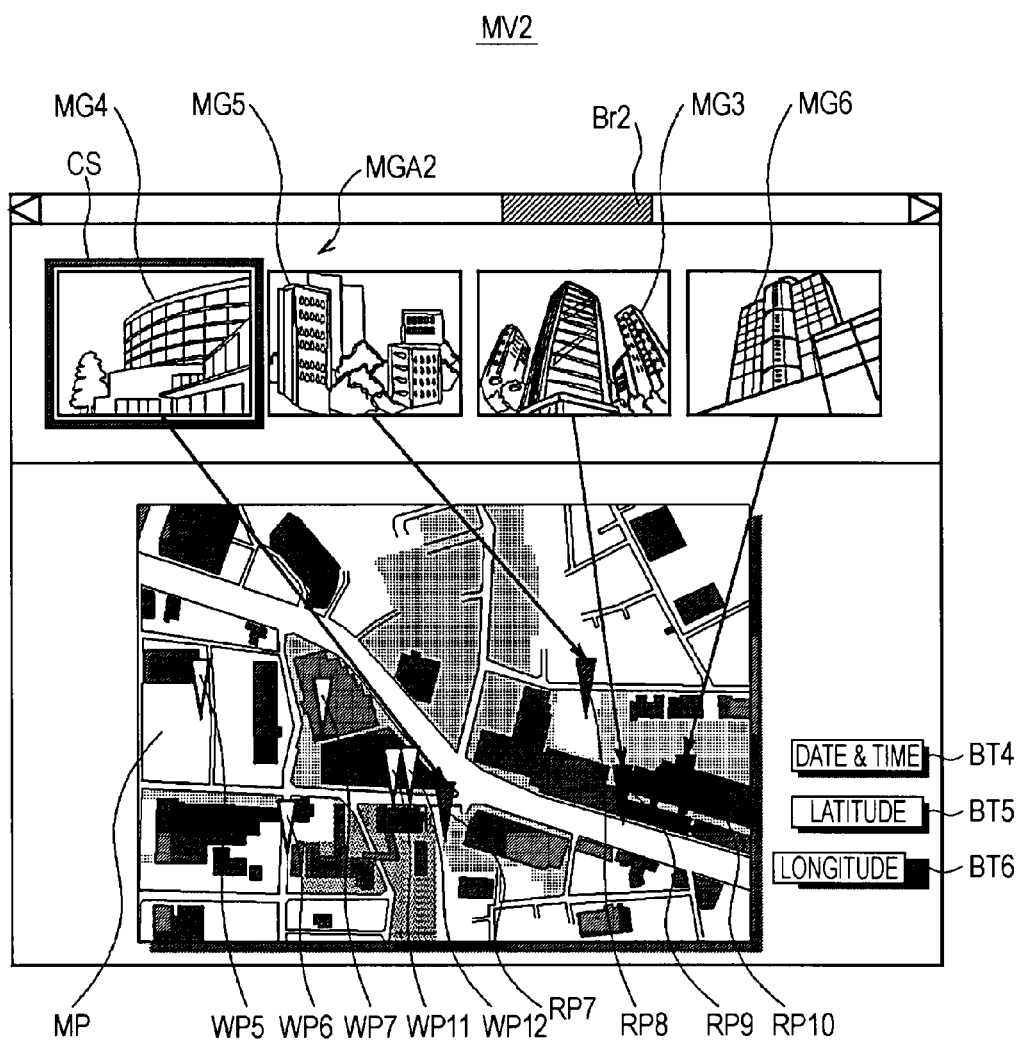
FIG. 18 is a schematic illustration of a longitudinally-ordered map view screen with a different image being selected by a scroll bar.

In this case, the reduced images MG4, MG5, MG3 and MG6, for example, will be displayed in the reduced image pasting area MGA2 of the map view screen MV2 as shown in FIG. 18 and the leftmost reduced image MG4 will be selected, instead of the reduced image MG1, by the cursor CS.

If YES in step SP12, indicating that different reduced images MG are displayed in the index, the CPU 10 proceeds to the next step SP13. If NO in step SP12, indicating that the same reduced images MG are displayed in the index, the CPU 10 proceeds to the next step SP15 to complete the processing.

In step SP13, the CPU 10 sets the positional information (latitude/longitude) of the newly selected reduced image MG4, for example, as the latitudinal/longitudinal sorting reference point and returns back to the subroutine SRT7 to repeat the processing described above.

In this manner, if the reduced image MG4 is selected in the reduced image pasting area MGA2 of the map view screen MV2, the display range of the map image MP is shifted and photographing location marks WP11, WP12, RP9 are displayed, instead of the photographing location marks RP5, RP6, WP8, and photographing location mark RP10 is newly displayed.

If the date & time button BT1 or BT4 is selected in the map view screen MV1 (FIG. 15) or MV2 (FIG. 16), the CPU 10 displays the reduced images MG in the order of photographing date and time.

Figure 19:
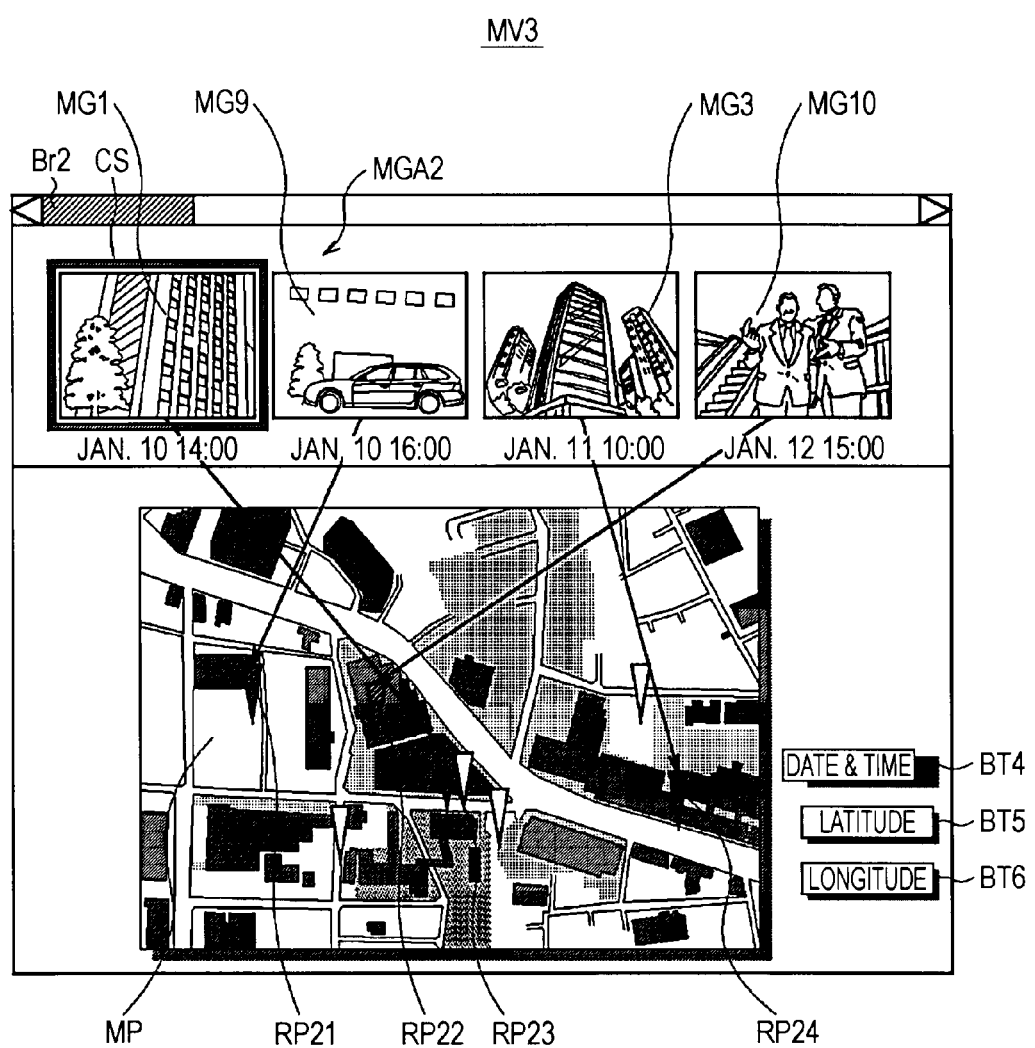
FIG. 19 is a schematic illustration of a map view screen with reduced images being arranged in the order of photographing date and time.

More specifically, the CPU 10 draws the reduced images MG1, MG9, MG3, MG10 in the reduced image pasting area MGA2 in the order of photographing date and time as shown in FIG. 19.

At the same time, the CPU 10 links the reduced images MG1, MG9, MG3, MG10 to the corresponding photographing location marks RP21-RP24 by drawing lines and arrows and thus displays a map view screen MV3 in the order of photographing date and time.

Since the index is displayed neither in latitudinal nor longitudinal order in this map view screen MV3 (FIG. 19), the lines linking the reduced image MG1, MG9, MG3, MG10 to the photographing location marks RP21-RP24 are crossed.

If YES in step SP2, indicating that the thumbnail display mode is selected, the CPU 10 proceeds to the next step SP14.

Figure 20:
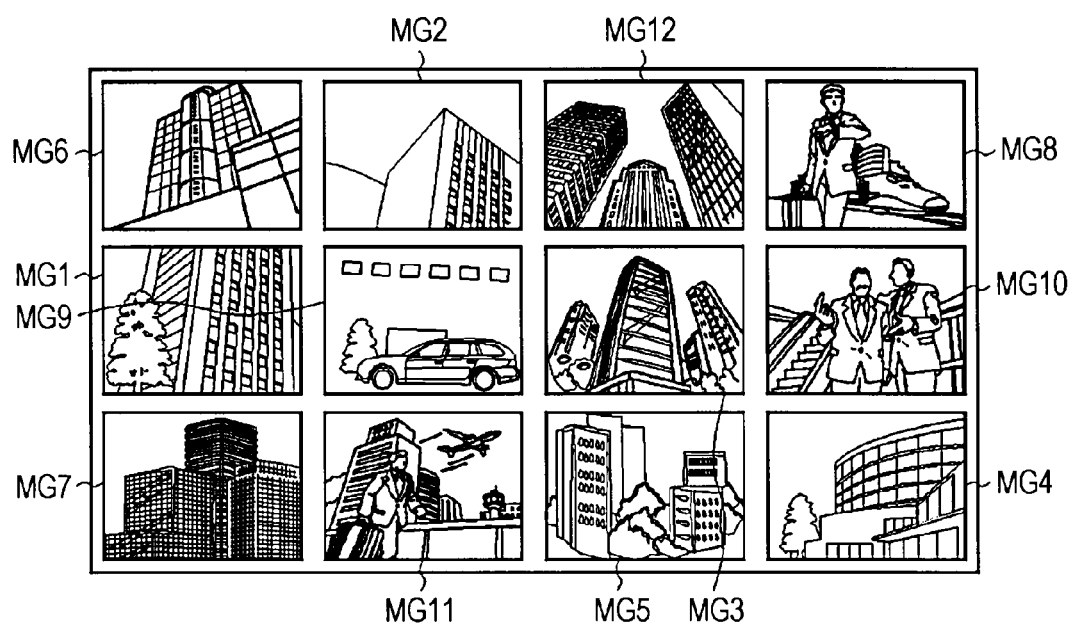
FIG. 20 is a schematic illustration of a thumbnail screen in a photographing date and time-ordered display mode.

In step SP14, the CPU 10 enters the thumbnail display mode and displays a thumbnail list of reduced images MG1-MG12 retrieved from the still image data files IDF1, IDF2, . . . , and moving image data file ADF1 in the order of photographing date and time as shown in FIG. 20, and then proceeds to the next step SP15 to complete the processing.

[1-3. Operation and Effects]

In the digital video camera 1 configured as described above, if the latitude button BT2 or BT5 is selected as the index display order, the CPU 10 displays the reduced images MG1-MG4 in latitudinal order in the reduced image pasting area MGA1 of the latitudinally-ordered map view screen MV1 (FIG. 15).

The CPU 10 also displays in red in the map image MP the photographing location marks RP1-RP4 corresponding to the reduced images MG1-MG4 and links the reduced images MG1-MG4 to the photographing location marks RP1-RP4 by drawing lines and arrows.

The CPU 10 enables, therefore, the correspondence relationship between the reduced images MG1-MG4 displayed vertically in latitudinal order and the photographing location marks RP1-RP4 to be readily recognized by the user and the photographing locations to be easily grasped in the map.

The CPU 10 can also match the order of the reduced images MG1-MG4 displayed vertically in latitudinal order to the order of the latitudinally-ordered photographing location marks RP1-RP4. The CPU 10 can accordingly link the reduced images MG1-MG4 to the photographing location marks RP1-RP4 without crossing the lines linking between them.

The CPU 10 can, therefore, display in a more visually easy-to-recognize manner the correspondence relationship between the reduced images MG1-MG4 displayed vertically in latitudinal order and the latitudinally-ordered photographing location marks RP1-RP4.

Furthermore, the CPU 10 displays in red the photographing location marks RP1-RP4 corresponding to the reduced images MG1-MG4 included in the index, while displaying in white the photographing location marks WP1-WP4 not corresponding to the reduced images included in the index.

The CPU 10 can accordingly make the red photographing location marks RP1-RP4 stand out from the white photographing location marks WP1-WP4 in the map image MP, enabling the user to readily recognize the geographical locations of the reduced images MG1-MG4 included in the index.

Furthermore, if the longitude button BT3, for example, is selected in the map view screen MV1 (FIG. 15), the CPU 10 can switch from the map view screen MV1 to the map view screen MV2 (FIG. 16).

In this case, the CPU 10 displays the reduced images MG1, MG2, MG4 and MG5 horizontally in longitudinal order in the reduced image pasting area MGA2 of the longitudinally-ordered map view screen MV2 (FIG. 16).

In addition, the CPU 10 displays the photographing location marks RP5-RP8 corresponding to the reduced images MG1, MG2, MG4, and MG5 in red in the map image MP and links the reduced images MG1, MG2, MG4, and MG5 to the photographing location marks RP5-RP8 by drawing lines and arrows.

The CPU 10 enables, therefore, the correspondence relationship between the reduced images MG1, MG2, MG4, and MG5 displayed horizontally in longitudinal order and the photographing location marks RP5-RP8 to be readily recognized by the user and the photographing locations to be to easily grasped in the map.

The CPU 10 can also match the order of the reduced images MG1, MG2, MG4, and MG5 displayed horizontally in longitudinal order to the order of the longitudinally-ordered photographing location marks RP5-RP8. The CPU 10 can, therefore, link the reduced images MG1, MG2, MG4, and MG5 to the photographing location marks RP5-RP8 without crossing the lines linking between them.

In this manner, the CPU 10 can display in a more visually easy-to-recognize manner the correspondence relationship between the reduced images MG1, MG2, MG4, and MG5 displayed horizontally in longitudinal order and the longitudinally-ordered photographing location marks RP5-RP8.

Furthermore, the CPU 10 displays in red the photographing location marks RP5-RP8 corresponding to the reduced images MG1, MG2, MG4, and MG5 included in the index, while displaying in white the photographing location marks WP5-WP8 not corresponding to the reduced images included in the index.

In this manner, the CPU 10 can make the red photographing location marks RP5-RP8 stand out from the white photographing location marks WP5-WP8 in the map image MP, enabling the user to readily recognize the geographical locations of the reduced images MG1, MG2, MG4, and MG5 included in the index.

In the digital video camera 1 configured as described above, it is possible to switch between the map view screen MV1 for displaying the latitudinally-ordered index and the map view screen MV2 for displaying the longitudinally-ordered index.

Accordingly, the digital video camera 1 enables the user to readily recognize the correspondence relationship between the latitudinally or longitudinally-ordered reduced images MG and the photographing location marks RP displayed in the map.

2. Other Embodiments

In the embodiment described above, the positional information (latitude/longitude) in the still image data file IDF1, for example, closest to the present user location acquired by the positional information acquiring unit 13 is set as the latitudinal/longitudinal sorting reference point.

The present invention, however, is not limited to the above embodiment. In another embodiment, the positional information (latitude/longitude) of any reduced image MG selected by the user in the map view screen MV1 (FIG. 15) or MV2 (FIG. 16) may be set as the latitudinal/longitudinal sorting reference point.

The present invention is not limited to this embodiment. In still another embodiment, a database in which location names have been associated with positional information (latitude/longitude) in advance may be stored in advance in the recording medium 21. In this case, when the user inputs a location name, the CPU 10 may read the corresponding positional information (latitude/longitude) from the recording medium 21 and set this positional information as the latitudinal/longitudinal sorting reference point.

The present invention is not limited to this embodiment. In yet another embodiment, when the user touches any position in the map image MP, the positional information (latitude/longitude) in the still image data file IDF1, IDF2, . . . , or moving image data file ADF1 closest to this position may be set as the latitudinal/longitudinal sorting reference point.

The present invention is not limited to this embodiment. In yet another embodiment, the user may directly input any positional information (latitude/longitude) and set the positional information (latitude/longitude) in the still image data file IDF1, IDF2, . . . , or moving image data file ADF1 closest to the input positional information as the latitudinal/longitudinal sorting reference point.

In the embodiment described above, the map image MP is displayed centered around the positional information (latitude/longitude) in the still image data file IDF1, for example, closest to the present location acquired by the positional information acquiring unit 13.

The present invention, however, is not limited to this embodiment. In yet another embodiment, the positional information (latitude/longitude) in the still image data file IDF1, for example, closest to the present location acquired by the positional information acquiring unit 13 may be set as the latitudinal/longitudinal sorting reference point and a map image MP may be displayed, centered around the present location.

In the embodiment described above, one reduced image (MG1, for example) is linked by a line to one photographing location mark (RP5, for example).

Figure 21:
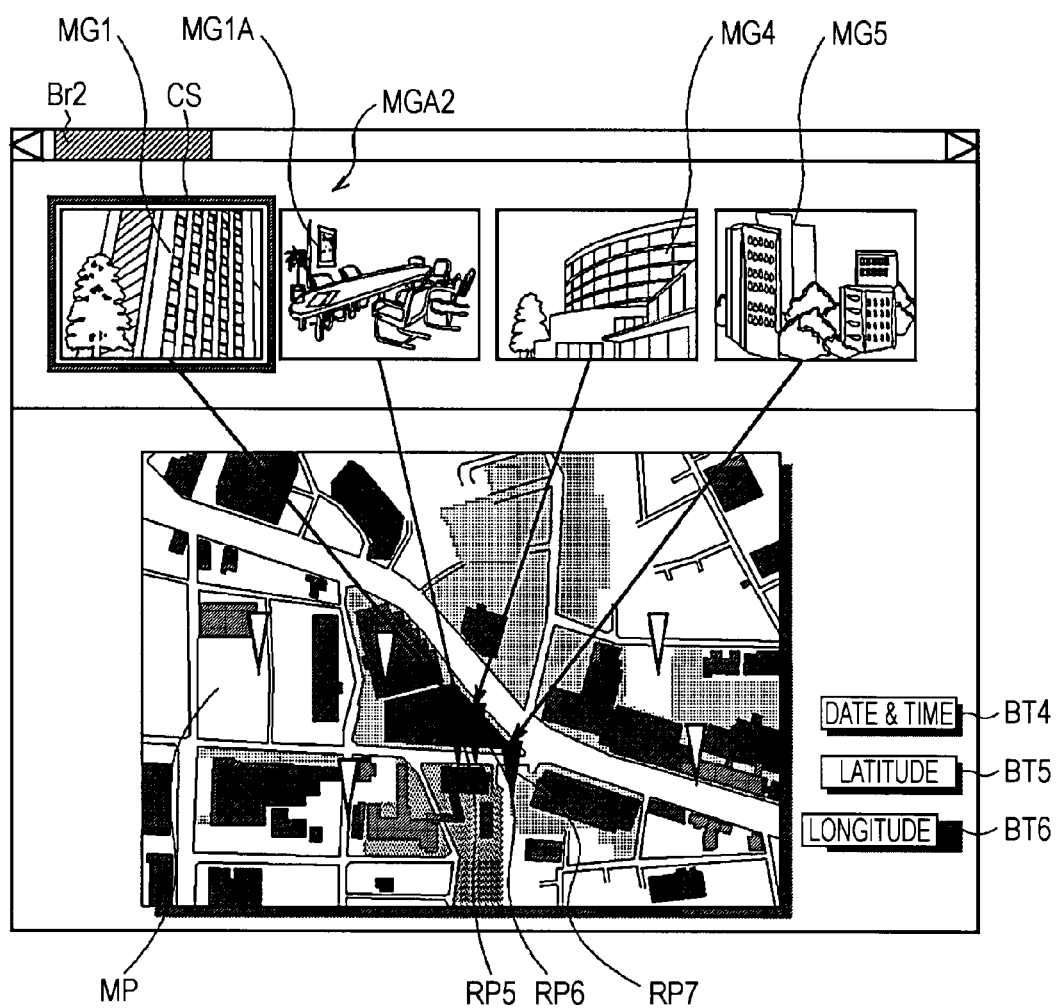
FIG. 21 is a schematic illustration of a map view screen according to another embodiment, with two images corresponding to a single photographing location.

The present invention, however, is not limited to this embodiment. If two still image data files IDF exist for one photographing location, for example, the reduced images MG1 and MG1A may be linked by a line to the photographing location mark RP5 as in the map view screen MV5 shown in FIG. 21, in which the same symbols are used at the corresponding parts in FIG. 16.

In the embodiment described above, one reduced image (MG1, for example) is linked by a line to one photographing location mark (RP5, for example).

Figure 22:
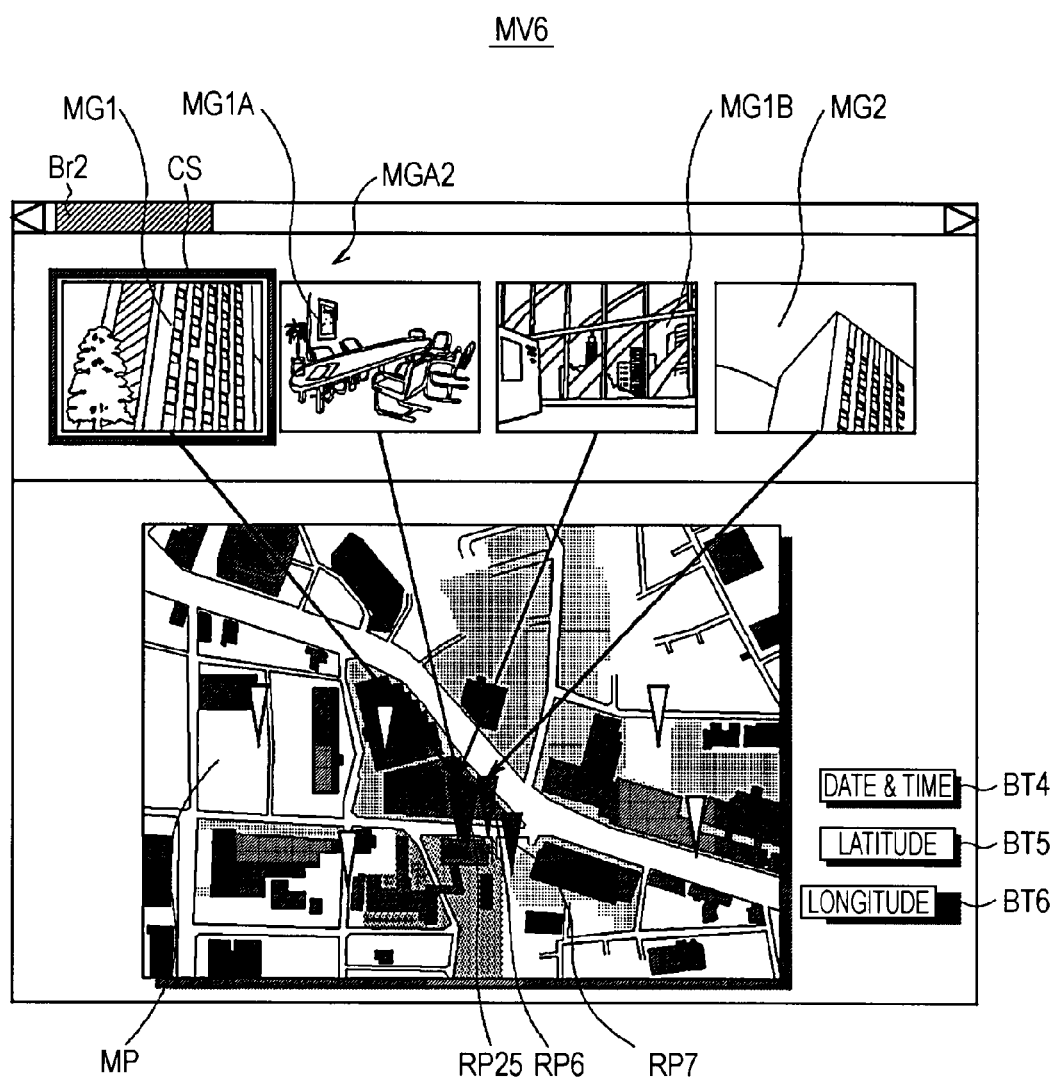
FIG. 22 is a schematic illustration of a map view screen according to still another embodiment, with more than two images corresponding to a single photographing location.

The present invention, however, is not limited to this embodiment. If two or more still image data files IDF exist for one photographing location, the reduced images MG1, MG1A, and MG1B, for example, may be linked by lines to the photographing location mark RP25 as in the map view screen MV6 shown in FIG. 22, in which the same symbols are used at the corresponding parts in FIG. 16.

In this case, the photographing location marks RP25 corresponding to the reduced images MG1, MG1A and MG1B are displayed overlapped.

In the embodiment described above, one reduced image (MG1, for example) is linked by a line to one photographing location mark (RP5, for example).

Figure 23:
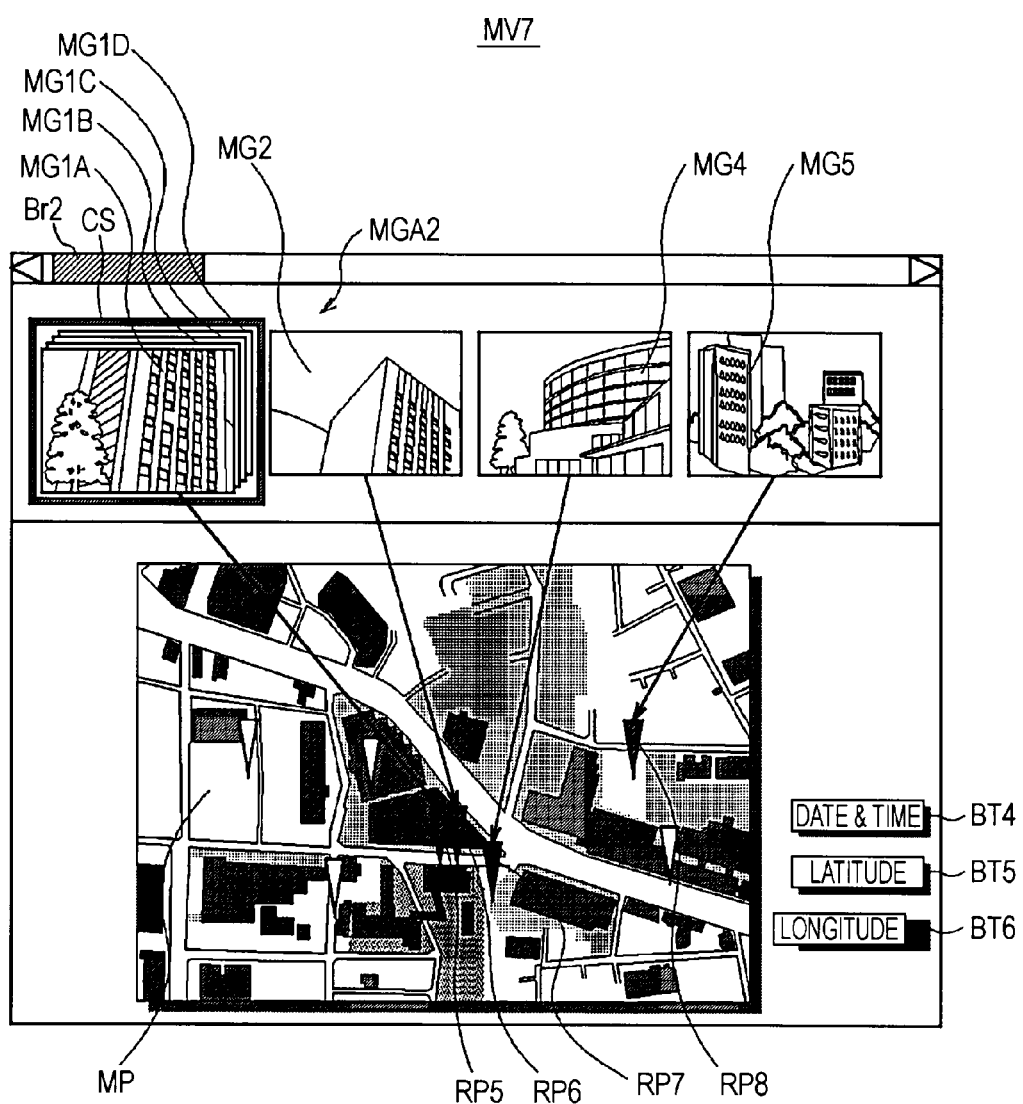
FIG. 23 is a schematic illustration of a map view screen according to yet another embodiment, with a plurality of images corresponding to a single photographing location.

The present invention, however, is not limited to this embodiment. In yet another embodiment, if a plurality of still image data files IDF exist for one photographing location, a plurality of overlapped reduced images MG1A-MG1D, for example, may be linked by lines to the photographing location mark RP5 as in the map view screen MV7 shown in FIG. 23, in which the same symbols are used at the corresponding parts in FIG. 16.

In the embodiment described above, the reduced images from the image data files IDF1, IDF2, . . . , and moving image data file ADF1 are displayed in the index.

The present invention, however, is not limited to this embodiment. In yet another embodiment, only the reduced images from the still image data files IDF1, IDF2, . . . may be displayed in the index, or only the reduced images from the moving image data files ADF1, . . . may be displayed in the index.

In the embodiment described above, the reduced images are displayed in latitudinal or longitudinal order in the index. The present invention, however, is not limited to this embodiment. In yet another embodiment, if positional information is acquired about altitude, in addition to latitude and longitude, the reduced images in the index may be displayed in the order of altitude.

In the embodiment described above, the map-related data file MDF is stored in the recording medium 21. The present invention, however, is not limited to this embodiment. In yet another embodiment, the map-related data file MDF may be stored in an external server and may be downloaded when necessary.

In the embodiment described above, four reduced images MG are pasted in the reduced image pasting area MGA1 or MGA2. The present invention, however, is not limited to this embodiment. In yet another embodiment, unreduced original images may be pasted.

In the embodiment described above, four reduced images MG are pasted in the reduced image pasting area MGA1 or MGA2. The present invention, however, is not limited to this embodiment. In yet another embodiment, two, six, eight, or any other number of reduced images MG may be pasted.

In the embodiment described above, the latitudinally/longitudinally-ordered index display processing procedure is executed in the routine RT1 according to the application program installed in advance.

The present invention, however, is not limited to this embodiment. In yet another embodiment, the latitudinally/longitudinally-ordered index display processing procedure may be executed according to an application program installed from a predetermined recording medium, an application program downloaded from the Internet, or an application program installed through any other route.

In the embodiment described above, the information processing device includes the CCD camera 15 as the imaging unit, the positional information acquiring unit 13 as the photographing location acquiring unit, the storage controlling unit, the photographing location mark generating unit, and the CPU 10 as the controlling unit.

The present invention, however, is not limited to this embodiment. In yet another embodiment, the information processing device may include a different imaging unit, different photographing location acquiring unit, different storage controlling unit, different photographing location mark generating unit, and different controlling unit.

The present application contains subject matter related to that disclosed in Japanese Priority Patent Application JP 2009-094123 filed in the Japan Patent Office on Apr. 8, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
   imaging means for photographing images;
   photographing location acquiring means for acquiring photographing locations corresponding to said images when said images are photographed by said imaging means;
   storage controlling means for storing said images sequentially photographed by said imaging means into predetermined storage means;
   photographing location mark generating means for generating predetermined photographing location marks for showing said photographing locations corresponding to said images in a map;
   controlling means for switching between a latitudinally-ordered display mode and a longitudinally-ordered display mode, the latitudinally-ordered display mode allowing said images to be read out of said storage means and displayed in latitudinal order and said photographing location marks corresponding to said images to be displayed in said map, the longitudinally-ordered display mode allowing said images to be read out of said storage means and displayed in longitudinal order and said photographing location marks corresponding to said images to be displayed in said map; and
   display means for displaying a Graphic User Interface (GUI) that includes:
   selectable areas for causing the controlling means to switch between the display modes,
   a map display area to display said map and said photographing location marks on said map, and
   an image display area to display said images or thumbnails thereof in accordance with a selected display mode, wherein
   said storage controlling means generates sort tables including a latitudinal image sort table that sorts file names for said images in said latitudinal order and a longitudinal image sort table that sorts file names for said images in said longitudinal order.

2. The information processing device according to claim 1, wherein said controlling means vertically arranges and displays said images in a column when said images are displayed in said latitudinal order and horizontally arranges and displays said images in a row when said images are displayed in said longitudinal order.

3. The information processing device according to claim 2, wherein said display means displays said images and said photographing location marks, linking said images or said thumbnails thereof to corresponding photographing location marks on said map among said photographing location marks with lines therebetween.

4. The information processing device according to claim 3, wherein, when said images are read out of said storage means and displayed in said latitudinal order, said controlling means arranges and displays said images in said latitudinal order starting with a photographing location among said photographing locations closest to a present location, and, when said images are read out of said storage means and displayed in said longitudinal order, said controlling means arranges and displays said images in said longitudinal order starting with a photographing location among said photographing locations closest to said present location.

5. An information processing method comprising the steps of:
   acquiring photographing locations corresponding to images when said images are photographed by imaging means for photographing said images;
   storing said images sequentially photographed by said imaging means into predetermined storage means;
   generating predetermined photographing location marks to show said photographing locations corresponding to said images in a map;
   controlling switching between a latitudinally-ordered display mode and a longitudinally-ordered display mode, the latitudinally-ordered display mode allowing said images to be read out of said storage means and displayed in latitudinal order and said photographing location marks corresponding to said images to be displayed in said map, the longitudinally-ordered display mode allowing said images to be read out of said storage means and displayed in longitudinal order and said photographing location marks corresponding to said images to be displayed in said map;
   displaying a Graphic User Interface (GUI) that includes:
   selectable areas for switching between the display modes,
   a map display area to display said map and said photographing location marks on said map, and
   an image display area to display said images or thumbnails thereof in accordance with a selected display mode; and
   generating and storing sort tables including a latitudinal image sort table that sorts file names for said images in said latitudinal order and a longitudinal image sort table that sorts file names for said images in said longitudinal order.

6. A non-transitory computer readable medium including a program for causing a computer to perform the steps of:

acquiring photographing locations corresponding to images when said images are photographed by imaging means for photographing said images;

controlling storage of said images sequentially photographed by said imaging means into predetermined storage means;

generating predetermined photographing location marks for showing said photographing locations corresponding to said images in a map;

controlling switching between a latitudinally-ordered display mode and a longitudinally-ordered display mode, the latitudinally-ordered display mode allowing said images to be read out of said storage means and displayed in latitudinal order and said photographing location marks corresponding to said images to be displayed in said map, the longitudinally-ordered display mode allowing said images to be read out of said storage means and displayed in longitudinal order and said photographing location marks corresponding to said images to be displayed in said map;

displaying a Graphic User Interface (GUI) that includes:

selectable areas for switching between the display modes, a map display area to display said map and said photographing location marks on said map, and an image display area to display said images or thumbnails thereof in accordance with a selected display mode; and generating and storing sort tables including a latitudinal image sort table that sorts file names for said images in said latitudinal order and a longitudinal image sort table that sorts file names for said images in said longitudinal order.

7. An information processing device comprising:

an imaging unit to photograph images;

a photographing location acquiring unit to acquire photographing locations corresponding to said images when said images are photographed by said imaging unit;

a storage controlling unit to store said images sequentially photographed by said imaging unit into predetermined storage unit;

a photographing location mark generating unit to generate predetermined photographing location marks for showing said photographing locations corresponding to said images in a map;

a controlling unit to switch between a latitudinally-ordered display mode and a longitudinally-ordered display mode, the latitudinally-ordered display mode allowing said images to be read out of said storage unit and displayed in latitudinal order and said photographing location marks corresponding to said images to be displayed in said map, the longitudinally-ordered display mode allowing said images to be read out of said storage unit and displayed in longitudinal order and said photographing location marks corresponding to said images to be displayed in said map; and a display that is controlled to display a Graphic User Interface (GUI) that includes:

selectable areas for causing the controlling means to switch between the display modes, a map display area to display said map and said photographing location marks on said map, and an image display area to display said images or thumbnails thereof in accordance with a selected display mode, wherein said storage controlling unit generates sort tables including a latitudinal image sort table that sorts file names for said images in said latitudinal order and a longitudinal image sort table that sorts file names for said images in said longitudinal order.

8. The information processing device according to claim 1, wherein said map and said photographing location marks are displayed, together with corresponding images or thumbnails thereof, by searching a sort table, which was generated by said storage controlling means, that corresponds to a selected display mode.

9. The information processing device according to claim 1, wherein said image display area displays a first number of said images or said thumbnails thereof, and said map display area displays a second number, which is greater than said first number, of said photographing location marks, including photographing location marks for said images or said thumbnails thereof that are displayed in said image display area and photographing location marks for images or thumbnails thereof that are not displayed in said image display area.

10. The information processing device according to claim 9, wherein said photographing location marks for said images or said thumbnails thereof that are displayed in said image display area are displayed with a first color or highlight, and said photographing location marks for said images or said thumbnails thereof that are not displayed in said image display area are displayed with a second color or highlight that is different from said first color.

11. The information processing device according to claim 1, wherein said image display area includes a scroll bar such that said image display area is a scrollable display area.

12. The information processing device according to claim 11, wherein said photographing location marks are displayed on said map based on a position of said scroll bar, such that said photographing location marks are displayed on said map include at least said images or said thumbnails thereof that are displayed in said image display area.

13. The information processing device according to claim 1, wherein said display modes include a time-ordered display mode allowing said images to be read out of said storage means and displayed in a time order and said photographing location marks correspond to said images to be displayed in said map.

* * * * *